(12) United States Patent
Yu et al.

(10) Patent No.: US 11,483,910 B2
(45) Date of Patent: Oct. 25, 2022

(54) PROTECTION CIRCUIT, DRIVE SYSTEM, CHIP AND CIRCUIT PROTECTION METHOD, AND DRIVE METHOD

(71) Applicant: Shanghai Bright Power Semiconductor Co., Ltd., Shanghai (CN)

(72) Inventors: Wei-Jia Yu, Shanghai (CN); Min-Min Fan, Shanghai (CN); Feng Qi, Shanghai (CN); Shun-Gen Sun, Shanghai (CN); Fu-Qiang Zhang, Shanghai (CN)

(73) Assignee: SHANGHAI BRIGHT POWER SEMICONDUCTOR CO., LTD., Shanghai (CN)

( * ) Notice: Subject to any disclaimer, the term of this patent is extended or adjusted under 35 U.S.C. 154(b) by 0 days.

(21) Appl. No.: 17/152,373

(22) Filed: Jan. 19, 2021

(65) Prior Publication Data

US 2021/0144832 A1    May 13, 2021

Related U.S. Application Data

(63) Continuation of application No. 16/459,321, filed on Jul. 1, 2019, now abandoned, which is a continuation
(Continued)

(30) Foreign Application Priority Data

Apr. 30, 2018    (CN) .......................... 201810406503.7

(51) Int. Cl.
    *H05B 45/50*    (2022.01)
    *H05B 45/37*    (2020.01)
    *H02M 1/14*    (2006.01)

(52) U.S. Cl.
    CPC ............. *H05B 45/50* (2020.01); *H05B 45/37* (2020.01); *H02M 1/14* (2013.01)

(58) Field of Classification Search
    CPC .......... G01C 19/56; H02M 1/08; H02M 1/12; H02M 1/14; H02M 1/15
    See application file for complete search history.

(56) References Cited

U.S. PATENT DOCUMENTS 3,651,458 A * 3/1972 Reynolds, Jr. ........... G06K 1/18
    714/807
5,777,866 A * 7/1998 Jacobs .................... H02M 1/44
    363/126

(Continued)

*Primary Examiner* — Abdullah A Riyami
*Assistant Examiner* — Syed M Kaiser
(74) *Attorney, Agent, or Firm* — Muncy, Geissler, Olds & Lowe, P.C.

(57) ABSTRACT

A linear driving system for LED with high power factor including a rectifying circuit receiving an AC voltage and generating a DC voltage to a power supply bus having a protection circuit coupled thereto. The protection circuit includes a detection unit for acquiring a voltage signal based on a power supply bus voltage, and to generate a detection result which indicates undesirable oscillation on the power supply bus voltage. A control unit includes a delay control module connected with the detection unit, and is coupled to the detection unit and for generating a control signal based on the detection result. The delay control module is for outputting a first control signal when undesirable oscillation happens, and outputting a second control signal after a protection period when undesirable oscillation disappears. A switch circuit controlled by the first control signal and the second control signal turns off for the protection period.

16 Claims, 12 Drawing Sheets

Related U.S. Application Data of application No. 16/230,882, filed on Dec. 21, 2018, now abandoned.

(56) References Cited

U.S. PATENT DOCUMENTS

| | | | | |
|---|---|---|---|---|
| 8,975,831 B1* | 3/2015 | Szolusha | ............... | H05B 45/10 315/291 |
| 2008/0002440 A1* | 1/2008 | Cheng | ............... | H02M 1/08 363/21.02 |
| 2009/0078045 A1* | 3/2009 | Kanai | ............... | G01C 19/56 327/108 |
| 2010/0206074 A1* | 8/2010 | Yoshida | ............... | H03K 5/1515 73/504.12 |
| 2010/0246227 A1* | 9/2010 | Shimizu | ............... | H02M 3/156 363/126 |
| 2011/0037401 A1* | 2/2011 | Yu | ............... | H05B 31/50 315/246 |
| 2011/0121907 A1* | 5/2011 | Kanai | ............... | G01C 19/56 331/109 |
| 2011/0199010 A1* | 8/2011 | Cho | ............... | H02M 1/083 315/186 |
| 2011/0234115 A1* | 9/2011 | Shimizu | ............... | H05B 45/37 315/287 |
| 2012/0283878 A1* | 11/2012 | Roberts | ............... | H05B 47/185 700/275 |
| 2013/0093327 A1* | 4/2013 | Lee | ............... | H05B 45/38 315/122 |
| 2014/0028185 A1* | 1/2014 | Nobata | ............... | H05B 45/375 315/51 |
| 2014/0071719 A1* | 3/2014 | Stahl | ............... | H02M 1/15 363/44 |
| 2014/0159591 A1* | 6/2014 | Terasaka | ............... | H05B 45/50 315/185 R |
| 2014/0192569 A1* | 7/2014 | Espino | ............... | G01R 19/1659 363/50 |
| 2015/0048677 A1* | 2/2015 | Gong | ............... | H05B 45/10 315/307 |
| 2015/0048678 A1* | 2/2015 | Gong | ............... | H05B 45/10 315/307 |
| 2015/0123574 A1* | 5/2015 | Hu | ............... | H05B 45/39 315/307 |
| 2016/0061871 A1* | 3/2016 | Stahl | ............... | G01R 31/42 324/613 |
| 2016/0094056 A1 | 3/2016 | Dulle | | |
| 2016/0101278 A1 | 4/2016 | Norris et al. | | |
| 2016/0116925 A1* | 4/2016 | Freeman | ............... | H02M 3/33515 307/130 |
| 2016/0124029 A1* | 5/2016 | Gobbi | ............... | H02J 7/0071 320/166 |
| 2016/0172975 A1* | 6/2016 | Takeya | ............... | H03K 17/162 363/126 |
| 2016/0174329 A1* | 6/2016 | Su | ............... | H05B 45/50 315/125 |
| 2016/0181908 A1* | 6/2016 | Soares | ............... | H02M 3/33507 363/21.01 |
| 2017/0079098 A1* | 3/2017 | Mitterbacher | ..... | H02M 3/33523 |
| 2017/0150568 A1* | 5/2017 | Hayashi | ............... | H02M 1/36 |
| 2017/0188420 A1* | 6/2017 | Kido | ............... | H05B 47/25 |
| 2017/0196064 A1* | 7/2017 | Xiong | ............... | F21V 3/061 |
| 2017/0359881 A1* | 12/2017 | Hsia | ............... | F21V 25/12 |
| 2018/0220502 A1* | 8/2018 | Morales | ............... | H05B 45/44 |
| 2019/0047825 A1 | 2/2019 | Jakes et al. | | |
| 2019/0165685 A1* | 5/2019 | Lind | ............... | H02M 1/08 |
| 2021/0301987 A1* | 9/2021 | Xiong | ............... | F21K 9/275 |

* cited by examiner

PROTECTION CIRCUIT, DRIVE SYSTEM, CHIP AND CIRCUIT PROTECTION METHOD, AND DRIVE METHOD

RELATED APPLICATION

This is a continuation application of U.S. patent application Ser. No. 16/459,321, filed Jul. 1, 2019, which is a continuation application of U.S. patent application Ser. No. 16/230,882, filed Dec. 21, 2018, which claims the benefit of Chinese patent application No. 201810406503.7, filed Apr. 30, 2018.

TECHNICAL FIELD

The present application relates to the technical field of drive circuit, particularly to a protection circuit, a drive system, a chip and a circuit protection method, and a drive method.

BACKGROUND

In the moment when the electronics is connected or during a thunderstorm, ring wave can be superimposed on the power lines and signal lines easily, for example, a surge phenomenon may occur. Under the interference of such ring wave, electronics may be damaged easily and result in safety risks. For example, for some DC-powered electronics such as LED lighting device, a drive circuit therein may be triggered to drive a load by mistake because of the interference of ring wave, thereby leading to abnormal operation of the load. For another example, during the drive circuit is driven, the drive circuit may generate an instantaneous overlarge voltage and current because of the interference of the ring wave, thereby leading to the breakdown of the semiconductor device in the drive circuit, and the drive circuit may be damaged.

SUMMARY

In view of the above shortcomings in the prior art, the objective of the present application is to provide a protection circuit, a drive system, a chip and a circuit protection method, and a drive method, so as to solve the problem of circuit protection of DC-powered electronics in the prior art.

In one aspect, the present application provides a protection circuit. The protection circuit is used in a circuit system in which a load is driven by a switch circuit. The protection circuit comprises a detection unit, configured to acquire a voltage signal reflecting a power supply bus voltage from an electronics which is connected with the power supply bus, convert the voltage signal into a detection signal, detect the detection signal, and output corresponding detection result based on a preset voltage warning condition; and a control unit, connected with an output terminal of the detection unit, and configured to control the switch circuit to maintain a forcible non-conductive state within a protection period when the received detection result indicates that the preset voltage warning condition is satisfied.

In some embodiments, the detection unit comprises: an acquisition module, connected with the power supply bus, and configured to acquire an instantaneous voltage signal of the power supply bus and output a detection signal corresponding to the instantaneous voltage signal; and a detection module, configured to detect the detection signal and output corresponding detection result based on the preset voltage warning condition.

In some embodiments, the detection unit comprises: an acquisition module, connected with the switch circuit, and configured to acquire a detection signal reflecting a change of the power supply bus voltage from the switch circuit; and a detection module, configured to detect the detection signal and output corresponding detection result based on the preset voltage warning condition.

In some embodiments, the acquisition module comprises a switch device, and a control terminal of the switch device is connected with the switch circuit, an output terminal of the switch device is connected with the detection module and is used to output the detection signal.

In some embodiments, the acquisition module comprises a high-pass filter, and one terminal of the high-pass filter is connected with the switch circuit, the other terminal of the high-pass filter is connected with the detection module and is used to output the detection signal.

In some embodiments, the detection unit comprises a comparator, and one input terminal of the comparator is used to receive the detection signal, the other input terminal of the comparator is used to receive an warning voltage threshold, and the comparator is configured to compare the voltage of the detection signal with the warning voltage threshold and output corresponding detection result.

In some embodiments, the preset voltage warning condition comprises an warning voltage threshold, the warning voltage threshold is preset based on the acquired voltage signal reflecting a power supply bus voltage.

In some embodiments, the control unit comprises: a delay control module, connected with the output terminal of the detection unit, and configured to output a first control signal when the received detection result indicates that the preset voltage warning condition is satisfied, start a delay timing based on the detection result output by the detection unit, and output a second control signal after the delay timing exceeds the protection period; and a switch circuit control module, connected with an output terminal of the delay control module and the control terminal of the switch circuit, and configured to control the switch circuit to turn to and maintain the forcible non-conductive state based on the first control signal, and release from the forcible non-conductive state based on the second control signal.

In some embodiments, the delay control module is configured to start the delay timing when the received detection result indicates that the preset voltage warning condition is satisfied.

In some embodiments, the delay control module is configured to output the second control signal when the received detection result indicates that the preset voltage warning condition is not satisfied and the delay timing exceeds the protection period.

In some embodiments, the delay control module is configured to, during a period of delay timing, restart a delay timing based on the received detection result which indicates that the preset voltage warning condition is satisfied.

In some embodiments, the switch circuit control module comprises any of the following: a voltage regulator, connected with the control terminal of the switch circuit, and configured to regulate a voltage on the control terminal of the switch circuit based on the first control signal and the second control signal; and a driver, connected with an input terminal of the switch circuit, and configured to control a drive unit of the switch circuit not to output a drive signal to the switch circuit when the first control signal is received, until the second control signal is received.

In some embodiments, an output terminal of the protection circuit is connected with a control terminal of a switch unit in the switch circuit, or the output terminal of the protection circuit is connected with an input terminal of a drive unit in the switch circuit, or the output terminal of the protection circuit is connected with a control terminal of the drive unit in the switch circuit.

In some embodiments, the circuit system is an LED drive system, and the load is LED load.

In another aspect, the present application provides a chip, the chip comprises an output terminal which is connected with a switch circuit arranged on a power supply bus; and the protection circuit mentioned above, wherein, the protection circuit is configured to control the switch circuit to maintain a forcible non-conductive state within a protection period.

In another aspect, the present application provides a drive system, the drive system comprises: a rectifying circuit, configured to rectify an external AC voltage and output the rectified external AC voltage to a power supply bus on which a load is located; a switch circuit, arranged on the power supply bus, and configured to control the power supply bus to be in a conductive state or non-conductive state; a linear compensation circuit, configured to output a linear compensation signal to the switch circuit based on an acquired electric signal reflecting a power supply bus voltage, such that the switch circuit drives the load based on the linear compensation signal during a period in which the switch circuit is not in a forcible non-conductive state; and the protection circuit mentioned above, connected with the switch circuit, and configured to control the switch circuit to maintain the forcible non-conductive state within a protection period.

In another aspect, the present application provides a method for protecting a circuit, the method is used in a circuit system in which a load is driven by a switch circuit, and comprises the following steps: acquiring a voltage signal reflecting a voltage of a power supply bus to which the load is connected, and generating a detection signal based on the voltage signal reflecting the voltage of a power supply bus; detecting the detection signal and obtaining corresponding detection result based on a preset voltage warning condition; controlling the switch circuit to maintain a forcible non-conductive state within a protection period when the detection result indicates that the preset voltage warning condition is satisfied; and not controlling the switch circuit to turn to the forcible non-conductive state when the detection result indicates that the preset voltage warning condition is not satisfied.

In some embodiments, the manner of acquiring a voltage signal reflecting a voltage of a power supply bus to which the load is connected, and generating a detection signal based on the voltage signal reflecting the voltage of a power supply bus comprises: acquiring an instantaneous voltage signal of the power supply bus and generating a detection signal corresponding to the instantaneous voltage signal.

In some embodiments, the manner of acquiring a voltage signal reflecting a voltage of a power supply bus to which the load is connected, and generating a detection signal based on the voltage signal reflecting the voltage of a power supply bus comprises: acquiring a detection signal reflecting a change of the power supply bus voltage from the switch circuit.

In some embodiments, the manner of detecting the detection signal and obtaining corresponding detection result based on a preset voltage warning condition comprises: comparing the voltage of the detection signal with the preset warning voltage threshold and outputting corresponding detection result.

In some embodiments, the manner of controlling the switch circuit to maintain a forcible non-conductive state within a protection period when the detection result indicates that a preset voltage warning condition is satisfied comprises: controlling the switch circuit to turn to and maintain the forcible non-conductive state when the detection result indicates that the preset voltage warning condition is satisfied; and starting a delay timing, and releasing the switch circuit from the forcible non-conductive state after the delay timing exceeds the protection period.

In some embodiments, the step of starting a delay timing, and releasing the switch circuit from the forcible non-conductive state after the delay timing exceeds the protection period comprises: starting the delay timing when the received detection result indicates that the preset voltage warning condition is satisfied, and releasing the maintained forcible non-conductive state after the delay timing exceeds the protection period.

In some embodiments, the step of starting a delay timing and releasing the switch circuit from the forcible non-conductive state after the delay timing exceeds the protection period comprises: releasing the maintained forcible non-conductive state when the received detection result indicates that the preset voltage warning condition is not satisfied and the delay timing exceeds the protection period.

In some embodiments, the step of starting a delay timing and releasing the switch circuit from the forcible non-conductive state after the delay timing exceeds the protection period comprises: restarting a timing based on the received detection result which indicates that the preset voltage warning condition is satisfied, and releasing the maintained forcible non-conductive state after the restarted timing exceeds the protection period.

In another aspect, the present application provides a drive method, the drive method comprises: rectifying an received AC voltage; outputting a linear compensation signal to a switch circuit which is arranged on a power supply bus based on an acquired electric signal reflecting a power supply bus voltage, such that the switch circuit is configured to drive a load based on the linear compensation signal during a period in which the switch circuit is not in a forcible non-conductive state; and each step in the method for protecting a circuit mentioned above.

As described above, the protection circuit, the drive system, the chip and the circuit protection method and the drive method in the present application have the following beneficial effects: through detecting whether the voltage signal reflecting a power supply bus voltage satisfies a preset voltage warning condition, and disconnecting the switch circuit forcibly and maintaining the forcible non-conductive state within a protection duration when the preset voltage warning condition is satisfied, thereby the damage to electronics caused by ring wave can be avoided.

DETAILED DESCRIPTION

Implementations of the present application will be described below through specific embodiments, and those skilled in the art can easily understand other advantages and effects of the present application from the contents disclosed in the present specification.

Moreover, as used herein, such single forms as "one", "a" and "the" aim at also including the plural forms, unless contrarily indicted in the text. It should be further understood that, such terms as "comprise" and "include" indicate the existence of the features, steps, operations, elements, components, items, types and/or groups, but do not exclude the existence, emergence or addition of one or more other features, steps, operations, elements, components, items, types and/or groups. The terms "or" and "and/or" used herein are explained to be inclusive, or indicate any one or any combination. Therefore, "A, B or C" or "A, B and/or C" indicates "any of the following: A; B; C; A and B; A and C; B and C; A, B and C". Exceptions of the definition only exist when the combinations of elements, functions, steps or operations are mutually exclusive inherently in some ways.

Because of the advantages such as easier to be generated and having low transmission loss, AC is an indispensable power supply source in daily life. DC-powered electronics needs to rectify the accessed AC, and to process the rectified voltage into a current which can supply power stably through a drive circuit, and provide the current to a load. Some DC-powered electronics can process the received AC into a power supply current which can drive a load through a switch circuit. Wherein, the switch circuit includes a switch unit, and can further include a switch unit and a drive unit; wherein, the switch unit includes but is not limited to either of a triode (BJT), a thyristor, a junction field effect transistor (JFET), or a depletion MOSFET etc. With an LED lighting device as an example, the LED lighting device includes an LED load, a switch circuit and a drive circuit. The switch circuit can be controlled into the conductive or non-conductive state at least based on a received control signal output from the drive circuit, and the drive circuit and the drive unit regulate the input current so as to provide a stable power supply to an LED load when the switch circuit is conductive. For example, the drive circuit includes a linear compensation circuit which will be described hereinafter.

Figure 1:
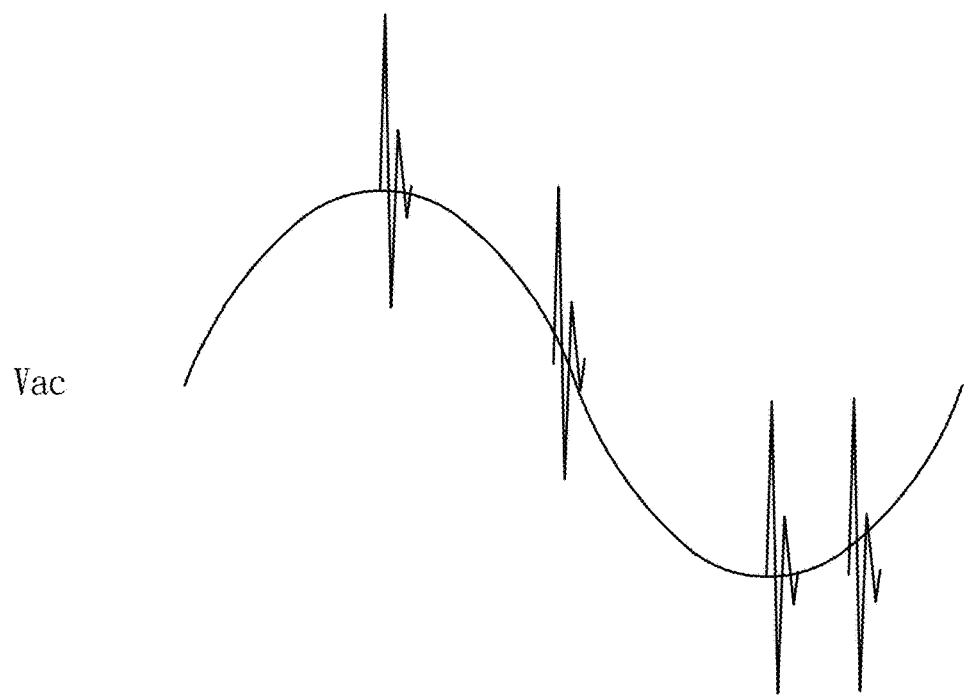
FIG. 1 is a schematic diagram showing waveform of AC being superimposed with waveform of ring wave.

Please refer to FIG. 1 which is a schematic diagram showing waveform of AC being superimposed with waveform of ring wave. As shown in the figure, during the conductive period of the switch circuit, when the AC (Vac) which is superimposed with ring wave randomly is provided to the LED lighting device, the drive circuit, the switch circuit or the LED load will be impact by the instantaneous high voltage and large current, and the semiconductor device included in the LED lighting device may be broken down and damaged; during the non-conductive period of the switch circuit, when the AC (Vac) which is superimposed with ring wave randomly is transmitted to the LED lighting device, the switch circuit may be turned on due to the instantaneous change of AC input voltage, then the drive circuit, switch circuit or the LED load will also be impact by the instantaneous large current, and the semiconductor device included in the LED lighting device therein may be damaged.

With the LED lighting device as an example and extending to other electronic device, in order to protect each electronics included in the electronic device, the present application provides a protection circuit. The protection circuit is arranged in a circuit system included in electronic device, and the circuit system is connected with a switch circuit. The circuit system includes a drive circuit of a load. The protection circuit is configured to acquire a voltage signal reflecting the voltage of a power supply bus which is connected with the load and generate a detection signal, and to control the switch circuit to maintain a forcible non-conductive state within a protection period when detecting that the voltage of the detection signal satisfies the preset voltage warning condition.

Figure 2:
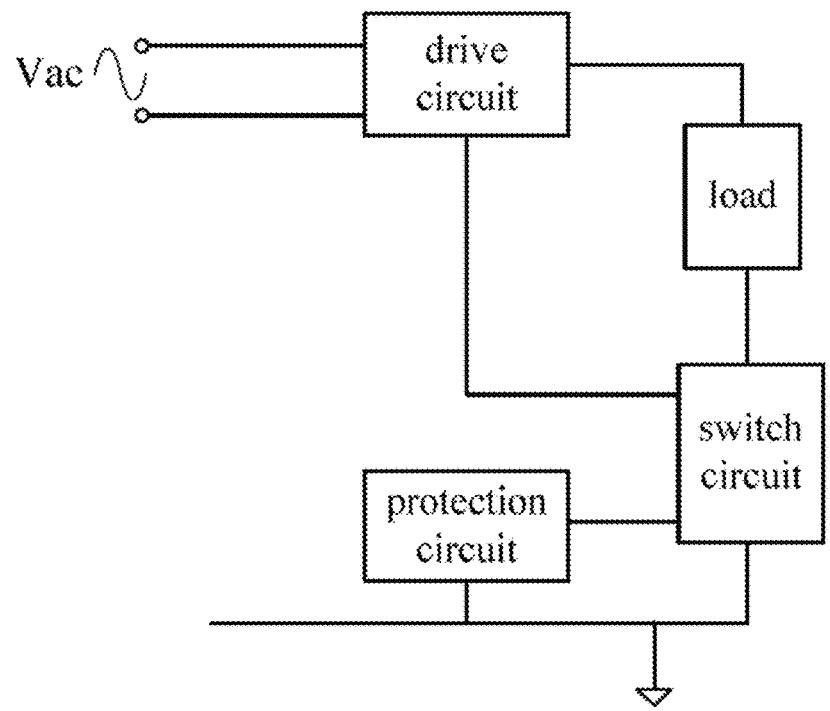
FIG. 2 shows a structural schematic diagram of a circuit system containing a drive circuit, a protection circuit, a switch circuit and a load in the present application.

Wherein, the power supply bus is a power supply transmission line between a rectifying unit and a load in the circuit system. In some examples, please refer to FIG. 2 which shows a structural schematic diagram of a circuit system containing a drive circuit, a protection circuit, a switch circuit and a load, wherein, the detection signal can be acquired from the power supply bus voltage directly to represent real-time instantaneous the power supply bus voltage. For example, the power supply bus voltage is served as the detection signal directly. For another example, the power supply bus voltage is detected by a sampling resistor and the detected voltage is served as the detection signal. The detection signal can also be used to reflect change of the voltage of the power supply bus. For example, the voltage signal reflecting the power supply bus voltage may be filtered by a high-pass filter, and the filtered voltage signal is served as the detection signal. For another example, the voltage signal at the terminal of the switch unit included in a switch circuit is sampled by a switch device and the sampled voltage signal is served as the detection signal.

Wherein, the preset voltage warning condition includes an warning voltage threshold. According to the actual design of the protection circuit, the preset voltage warning condition further includes judgment condition used for tendency prediction. For example, the judgment condition includes determining that AC input power which is superimposed with ring wave is provided to the power supply bus when the detection signal generated based on the voltage signal reflecting the power supply bus voltage is greater than or equal to the warning voltage threshold; or, the judgment condition includes determining that AC input power which is superimposed with ring wave is provided to the power supply bus when the detection signal generated based on the voltage signal reflecting the power supply bus voltage is less than or equal to the warning voltage threshold.

Wherein, in the period during which the protection circuit maintains the switch circuit to be in a forcible non-conductive state based on the detection result, the switch circuit shall not be controlled into conductive state based on other control signals generated from the drive circuit when the control signal output from the protection circuit is effective. In some conditions, the switch circuit can only be controlled by the protection circuit, when the protection circuit controls the switch circuit to turn to the forcible non-conductive state, the switch circuit cut off the power supply bus, such that the power supply bus may not provide power to the load, and when the protection circuit controls the switch circuit to release from the forcible non-conductive state, the status of the switch circuit can be controlled by the control signals generated from the drive circuit, such that the power supply bus can provide power to the load under the control of the switch circuit. In other conditions, the switch circuit is controlled by the drive circuit in the circuit system when the switch circuit is released from the forcible non-conductive state response to the control signal output from the protection circuit, that is, when the control signal output from the protection circuit is non-effective, the switch circuit can conduct the conductive/non-conductive operation or regulates the current flowing through the switch circuit based on the control signal output from the drive circuit, such that the power supply bus can provide power to the load under the control of power supply in the drive circuit.

Therefore, the input terminal of the protection circuit is connected with the power supply bus, the output terminal of the protection circuit is connected with the switch circuit; or the input terminal and the output terminal of the protection circuit are both connected with the switch circuit. Wherein, the input terminal of the protection circuit acquires voltage signal reflecting power supply bus voltage at one terminal of the switch circuit, and the output terminal of the protection circuit is connected with the input terminal or the control terminal of the switch circuit. According to the actual circuit design, the switch circuit includes a switch unit, or includes a switch unit and a drive unit, the control terminal of the switch circuit is connected with the control terminal or the input terminal of the switch unit, the output terminal of the protection circuit is connected with the control terminal of the switch circuit, for example, the switch circuit may be controlled into non-conductive state through adjusting the voltage at the control terminal of the switch circuit, so as to ensure that the power supply bus does not constitute a conductive loop which provide power to the load.

Figure 3:
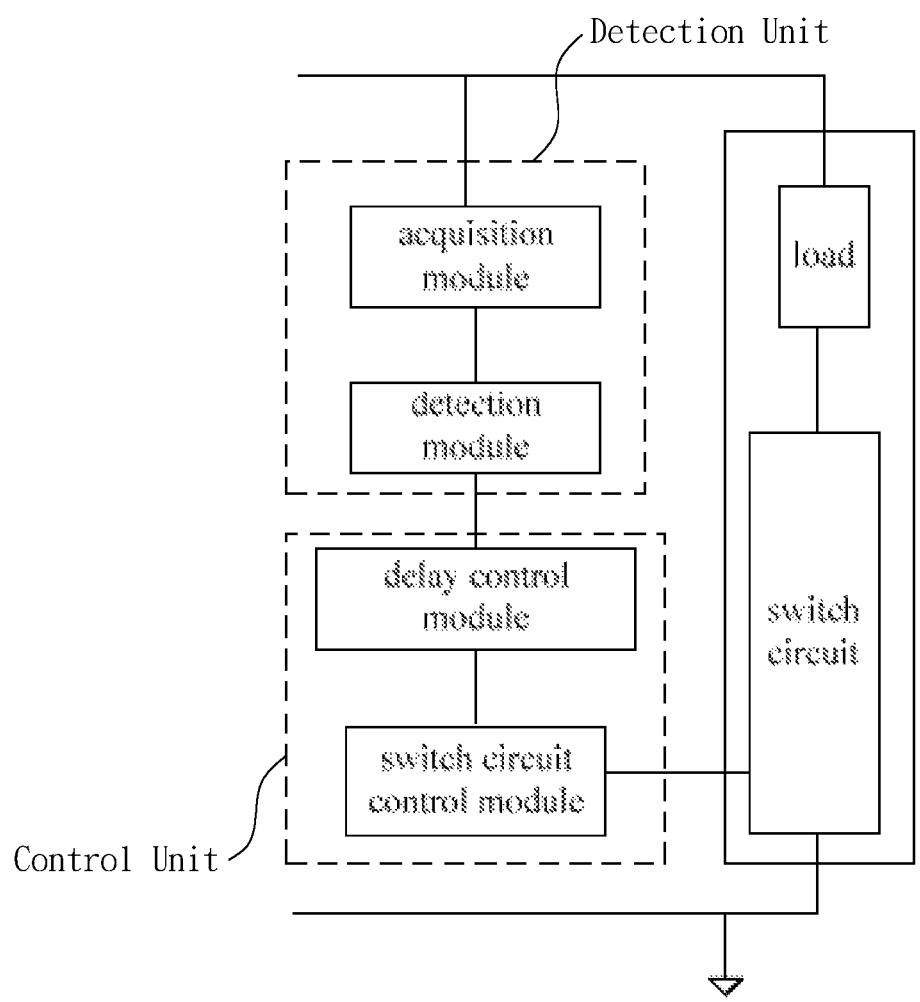
FIG. 3 shows a structural schematic diagram of the protection circuit in the present application in one embodiment.

Please refer to FIG. 3 which shows a structural schematic diagram of the protection circuit in the present application in one embodiment. The protection circuit includes a detection unit and a control unit.

The detection unit is configured to acquire a voltage signal reflecting the power supply bus voltage from an electronics which is connected with the power supply bus, and convert the voltage signal reflecting the power supply bus voltage into a detection signal, detect the detection signal and output corresponding detection result based on the preset voltage warning condition. Wherein, the electronics includes but is not limited to at least either of one of the wire, the load, or the switch circuit which constitute a conductive loop connected to the power supply bus.

Herein, the detection unit includes circuit modules connected to the electric connection positions at which the voltage signals reflecting the power supply bus voltage are acquired. Wherein, the electric connection position can be a position at which the input terminal of the protection circuit is connected with the electronics which is on the conductive loop connected to the power supply bus. For example, the electric connection position can be located on the power supply bus between the switch circuit and the load, or can be an access end of the load which is accessed to the power supply bus. For another example, the electric connection position can be a control terminal of the switch circuit, or an output terminal of a sampling circuit (for example, an acquisition module described below) which is configured to sample voltage signal of the power supply bus in a circuit system. In relation to the electric connection position, the voltage warning condition includes an warning voltage threshold which is preset according to the acquired voltage signal reflecting the voltage of the power supply bus, in other words, the voltage warning condition can be an warning voltage threshold which is preset according to a normal voltage range of the electric connection position.

In some embodiments, as shown in FIG. 3, the detection unit includes an acquisition module and a detection module. Wherein, the acquisition module is connected with a power supply bus and is configured to acquire an instantaneous voltage signal of the power supply bus and output a detection signal corresponding to the instantaneous voltage signal. Herein, the acquisition module is connected with any position on the power supply bus, for example, connected with an access end of the load.

In order to prevent ring wave from breaking down the semiconductor device in the switch circuit, the acquisition module can also connect with the input terminal of the switch circuit which is accessed to a conductive loop connected to the power supply bus.

In one specific example, the acquisition module receives an instantaneous voltage signal of the power supply bus directly and in real time through a wire, and serves the received instantaneous voltage signal as the detection signal and outputs to the detection module. In another specific example, the acquisition module includes a sampling resistor, the voltage of the power supply bus is divided by the sampling resistor, and based on an impedance of the sampling resistor, the corresponding voltage signal after voltage division is served as the detection signal and output to the detection module.

In some other embodiments, the acquisition module is connected with the switch circuit, and is configured to acquire the voltage signal reflecting the power supply bus voltage and generate the detection signal reflecting change of the power supply bus voltage. Herein, according to the actual circuit design, the acquisition module can be connected with the input terminal, the output terminal or the control terminal of the switch unit contained in the switch circuit. For example, the switch unit can be a gate drive NMOS tube, and the acquisition module is connected with the drain, the source or the gate of the NMOS tube.

In one specific example, the acquisition module is configured to sample a peak interval of the instantaneous voltage signal of the power supply bus from the switch circuit, so as to acquire a voltage signal reflecting magnitude change of voltage of the power supply bus. For example, the acquisition module includes a switch device, the control terminal of the switch device is connected with the switch circuit, and the output terminal of the switch device outputs the detection signal. For another example, the input terminal of the switch device can be connected with a constant voltage (VDD), the control terminal of the switch device is connected with the input terminal or the control terminal of the switch unit contained in the switch circuit, and the output terminal of the switch device is connected with the detection module. When the voltage signal reflecting the power supply bus voltage received by the control terminal of the switch device reaches the conductive condition at which the switch device is in conductive state, the switch device is turned on, correspondingly, the detection signal output by the output terminal of the switch device contained in the acquisition module to the detection module is an effective signal (such as high level signal, i.e., voltage VDD), otherwise, the switch device is turned off, and the detection signal output by the switch device to the detection module is a non-effective signal (such as a low level signal). Taking the switch device being a switch power tube M1 as an example, according to the actual connection of the switch device contained in the acquisition module in the circuit system, the gate of the switch device is the input terminal, the drain is the control terminal, the source is the output terminal, wherein, the gate of the switch device is connected with a constant voltage (VDD), the source is connected with the control terminal (for example, gate) of the switch unit in the switch circuit, and the drain is connected with the detection module. When the voltage signal reflecting the power supply bus voltage is received by the source terminal of the switch device, the detection signal output by the output terminal of the switch device to the detection module is an instantaneous voltage signal of the control terminal (for example, gate) of the switch unit in the switch circuit.

In another specific example, the acquisition module is configured to sample a voltage signal reflecting the change of the power supply bus voltage in the high-frequency intervals from the switch circuit, and output corresponding detection signal. For example, the acquisition module includes a high-pass filter, one terminal of the high-pass filter is connected with the switch circuit to acquire the voltage signal reflecting the power supply bus voltage, and the other terminal of the high-pass filter is connected with the detection module and outputs the detection signal. For example, the high-pass filter can be a filter, contains a capacitor and a resistor. For another example, the high-pass filter can be a filter which contains a capacitor, a resistor and an operational amplifier. With the high-pass filter containing a capacitor and a resistor as an example, one terminal of the capacitor is connected with the input terminal (or the control terminal) of the switch unit in the switch circuit, the other terminal of the capacitor is used as the output terminal, the resistor is connected between the output terminal of the high-pass filter and the ground, and when ring wave is superimposed on the AC input power and provided to the power supply bus, the high-pass filter outputs a detection signal containing ring wave.

The detection module is configured to detect the detection signal according to the preset voltage warning condition, and output corresponding detection result. For example, the detection module includes a comparator, and one input terminal thereof receives the detection signal, and the other input terminal receives an warning voltage threshold; the comparator compares the voltage of the detection signal with the warning voltage threshold and outputs corresponding detection result. For example, the positive input terminal of the comparator is connected with the output terminal of the acquisition module to receive the detection signal, and the negative input terminal of the comparator is connected with a constant voltage source to receive an warning voltage threshold. When the voltage of the detection signal is greater than or equal to the warning voltage threshold, the comparator outputs a high level to represent the detection result which indicates the ring wave is detected; otherwise, the comparator outputs a low level to represent the detection result which indicates the voltage of the power supply bus is within a normal range.

It should be noted that, those skilled in the art should understand that, according to the actual circuit design, voltage of detection signal received by the positive input terminal and an warning voltage threshold received by the negative input terminal of the comparator can be interchanged, and corresponding detection results are represented by the level signals opposite to these in the above example, and those will not be described in detail herein.

It should also be noted that, those skilled in the art can change or replace at least part of the circuit modules in the detection unit according to the detection manners of the above examples, such that the circuit structures which output a detection result conforming to ring wave detection should be deemed as specific examples within the scope of the present application, and these circuit structures will not be described in detail herein. Wherein, according to the circuit structure, signal forms of the output detection result can be different, for example, the detection result can be represented in a form of digital signal.

The detection result is output to the control unit in the protection circuit. The control unit determines whether to turn off the switch circuit forcibly based on the detection result, so as to protect the whole electronics from being damaged because of instantaneous, high-frequency and large current. In other words, when the received detection result indicates that the preset voltage warning condition is satisfied, the control unit will output an effective control signal, which will turn off the switch circuit and maintain the switch circuit in a forcible non-conductive state within a protection period; and when the received detection result indicates that the preset voltage warning condition is not satisfied, the control unit will output a non-effective control signal, such that the switch circuit state shall be controlled under the control signal output from the drive circuit included in the circuit system. Wherein, the protection period is used to prevent interference of continuous ring wave on the electronics. The protection period can be of a constant time duration, or can be of a time duration which can be adjusted along with the change of the detection result acquired in real time.

In some embodiments, the control unit can include a logic device group, a timer and a switch circuit controller. Wherein, the timer is used to time at least part of the time duration in the protection period, and output an overtime signal when the timing is exceeded. Based on the requirements of actual logic design, the logic device group can include at least one logic device, and corresponding logic configuration can be realized through electrical connection among logic devices. Wherein, the logic device includes but is not limited to either of an AND gate, an OR gate, a NAND gate, a NOT gate, an encoder, a decoder or a selector. According to the detection result and the overtime signal output by the timer, the logic device group is used to output a control signal based on which the switch circuit can be controlled. Based on the control signal output from the control unit, the switch circuit is turned off and maintain a forcible non-conductive state in a protection period, or release from the forcible non-conductive state.

In some conditions, the switch circuit can only be controlled by the protection circuit, when the control unit controls the switch circuit to turn to the forcible non-conductive state, the switch circuit cut off the conductive loop of the power supply bus, such that the power supply bus cannot provide power to the load, and when the control unit controls the switch circuit to release from the forcible non-conductive state, such that the switch circuit can be controlled by drive circuit, if the switch circuit is in conductive state, the power supply bus will be in conductive state through the switch circuit, such that the power supply bus can provide power to the load. In other conditions, the switch circuit is controlled by the drive circuit, when the control unit controls the switch circuit to turn to a forcible non-conductive state, the conductive loop of the power supply bus is disconnected forcibly through the switch circuit, and when the control unit controls the switch circuit to release from the forcible non-conductive state, the switch circuit is not disconnected forcibly, and the conductive/non-conductive operation of the switch circuit can be performed responding to the control signal output by the drive circuit of the circuit system, such that the load can operate under the power supply control of circuit system on the power supply bus.

In some embodiments, as shown in FIG. 3, the control unit includes a delay control module and a switch circuit control module.

The delay control module is connected with the output terminal of the detection unit, and is configured to output a first control signal (effective control signal) when the received detection result indicates that the preset voltage warning condition is satisfied, start a delay timing based on the detection result output by the detection unit, and output a second control signal (non-effective control signal) after the timing exceeds the protection period.

Herein, the delay control module can include the above logic device group, a timer and peripheral electronics, and so on; or the delay control module can include digital circuits which are set based on signal or information representing the detection result to realize corresponding processes. The delay control module outputs the first control signal when the received detection result indicates that the preset voltage warning condition is satisfied, wherein, the switch circuit control module can switch the switch circuit into a forcible non-conductive state forcibly based on the first control signal; simultaneously or delayingly, the delay control module can start a delay timing, and output the second control signal after the timing is exceeded, wherein, the switch circuit control module can release the switch circuit from the forcible non-conductive state based on the second control signal, that is, the switch circuit is not disconnected forcibly.

Figure 4:
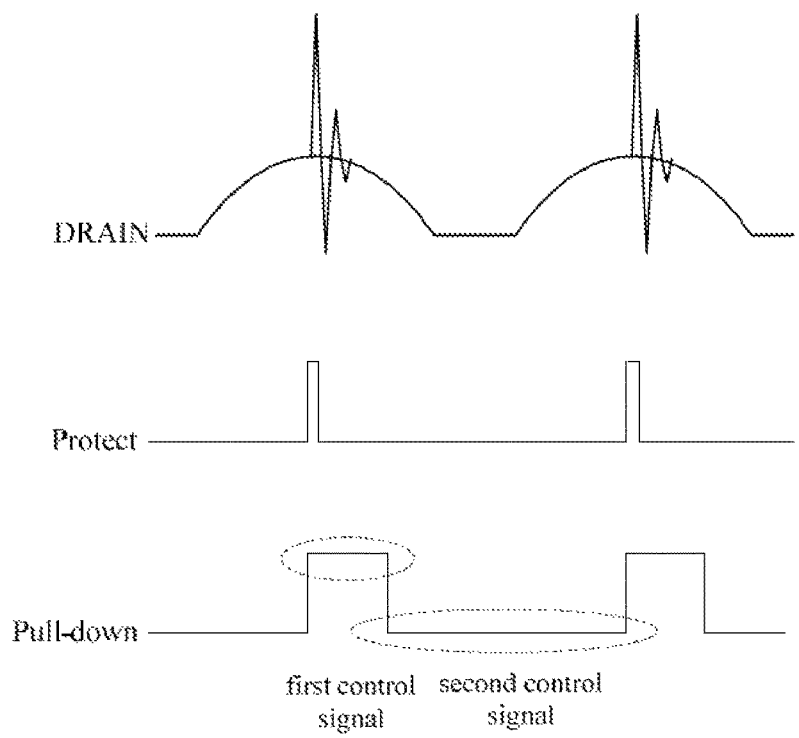
FIG. 4, FIG. 5 and FIG. 6 show waveform schematic diagrams of waveform (DRAIN) of voltage on the input terminal of the switch unit, waveform (Protect) of corresponding detection result and waveform (Pull-down) of corresponding control signal in the present application in one embodiment.

In order to control the time duration of the protection period effectively, in some embodiments, the delay control module starts the delay timing when the received detection result indicates that the preset voltage warning condition is satisfied. In some embodiments, the delay control module starts a delay timing when one situation in which the preset voltage warning condition is satisfied is turned to another situation in which the preset voltage warning condition is not satisfied. With the detection result being a level signal as an example, please refer to FIG. 4 which shows waveform schematic diagrams of waveform (DRAIN) of voltage on the input terminal of the switch unit, waveform (Protect) of corresponding detection result and waveform (Pull-down) of corresponding control signal in one embodiment. Wherein, high level signal of Protect indicates that the voltage warning condition is satisfied, and low level signal of Protect indicates that the voltage warning conditions is not satisfied. The delay control module outputs the first control signal (the high level interval of control signal) when detecting an rising edge of the waveform of detection result, and starts the delay timing when detecting a falling edge of the waveform of detection result, and outputs the second control signal (the low level interval of control signal) after the delay timing exceeds the protection period.

In other embodiments, the delay control module outputs the second control signal when the received detection result indicates that the preset voltage warning condition is not satisfied and the delay timing exceeds the protection period.

Figure 5:
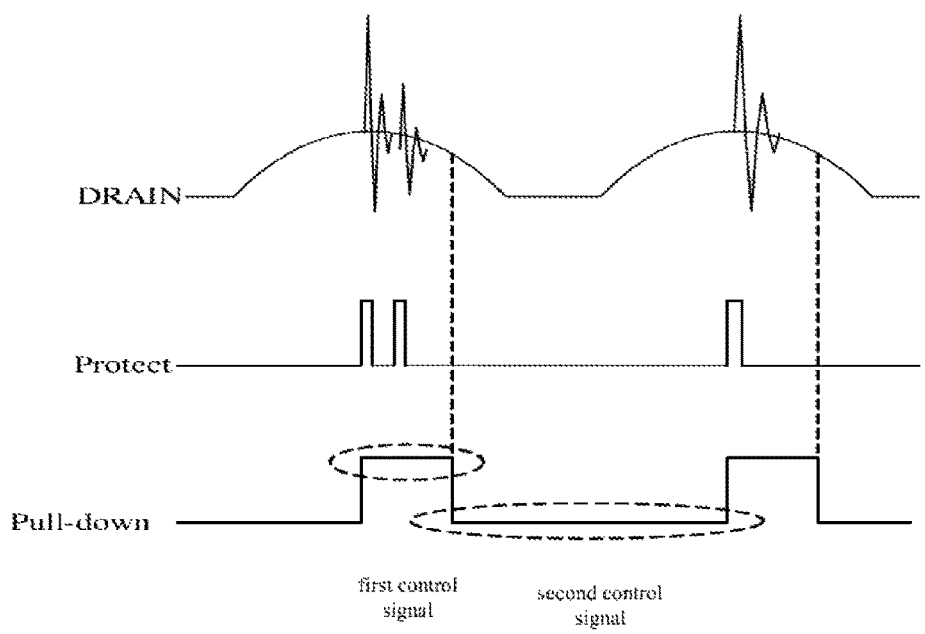

Still with the detection result being a level signal as an example, please refer to FIG. 5 which shows waveform schematic diagrams of waveform (DRAIN) of voltage on the input terminal of the switch unit, waveform (Protect) of corresponding detection result and waveform (Pull-down) of corresponding control signal in another embodiment. Wherein, the high level signal of Protect indicates that the voltage warning condition is satisfied, and the low level signal of Protect indicates that the voltage warning conditions is not satisfied. The delay control module outputs the first control signal (the high level interval of control signal) when detecting an rising edge of the waveform of detection result, and starts the delay timing when detecting a falling edge of the waveform of detection result, and outputs the second control signal (the low level interval of control signal) when the delay timing exceeds the protection period and the waveform of the detection result is at low level.

Figure 6:
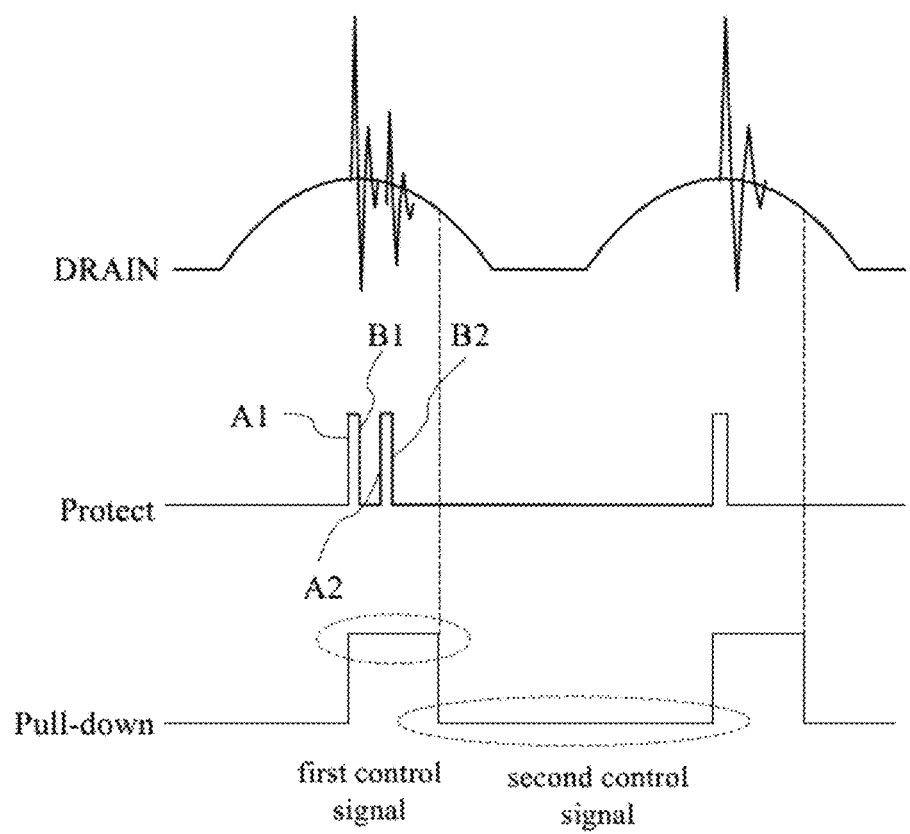

In order to prevent the execution of multiple detection caused by continuous fluctuation of ring wave, in still other embodiments, during the period of the delay timing, the delay control module restarts a timing based on the received detection result which indicates that preset voltage warning condition is satisfied. Still with the detection result being a level signal as an example, please refer to FIG. 6 which shows waveform schematic diagrams of waveform (DRAIN) of voltage on the input terminal of the switch unit, waveform (Protect) of corresponding detection result and waveform (Pull-down) of corresponding control signal in another embodiment. Wherein, high level signal of Protect indicates that the voltage warning condition is satisfied, and low level signal of Protect indicates that the voltage warning conditions is not satisfied. The delay control module outputs the first control signal (the high level interval of control signal) when detecting an rising edge A1 of the waveform of detection result, and starts the delay timing when detecting a falling edge B1 of the waveform of detection result. During the period of the delay timing, the delay control module resets the timer when detecting another rising edge A2 and restarts a delay timing when detecting another falling edge B2, and outputs the second control signal (the low level interval of control signal) when the delay timing exceeds the protection period and the waveform of detection result is continuously at low level.

It should be noted that, the above delay control module combines logic devices based on control logics, for example, signal logic combination in any of the above examples can be realized by combining logic gate with logic device of a trigger, and first control signal and second control signal can be output correspondingly according to the detection result and protection period.

The switch circuit control module is connected with the output terminal of the delay control module and the control terminal of the switch circuit, and is configured to control the switch circuit to turn to and maintain a forcible non-conductive state based on the first control signal and release from the forcible non-conductive state based on the second control signal, that is, the switch circuit does not need to maintain in conductive state forcibly.

In some embodiments, the switch circuit control module controls the switch circuit to be turn off forcibly through controlling the voltage at the control terminal of the switch circuit, so as to realize the purpose that the switch circuit is not controlled by other drive circuits in the circuit system. In one specific example, the switch circuit control module includes a voltage regulator, and the voltage regulator is connected with the control terminal of the switch circuit, and is configured to regulate the voltage at the control terminal of the switch circuit based on the first control signal and the second control signal. Wherein, the voltage regulator includes a switch device, and the voltage at the control terminal of the switch circuit is regulated through the turn-on/turn-off of the switch device. The voltages at the control terminal regulated by the voltage regulator differ from each other according to valid/invalid level signal at the control terminal in the switch circuit. With the switch circuit including a switch unit and a drive unit as an example, wherein, the switch unit includes a gate drive NMOSFET, the control terminal of the switch unit is the gate of the NMOSFET, and the output terminal of the voltage regulator is connected with the gate of the NMOSFET. When the voltage regulator receives the first control signal, the voltage regulator is in conductive state such that the gate of the NMOSFET is grounded so as to disconnect the NMOSFET, and when the voltage regulator receives the second control signal, the voltage regulator is in non-conductive state such that the gate of the NMOSFET is driven and controlled by the drive unit. Still with the switch circuit including a switch unit and a drive unit as an example, wherein, the drive unit includes an enable terminal, and the output terminal of the voltage regulator is connected with the enable terminal. When the voltage regulator receives the first control signal, the voltage regulator is in a conductive state so that the drive unit cannot output a drive signal, and when the voltage regulator receives the second control signal, the voltage regulator is in a non-conductive state so that the drive unit can be controlled by other circuits in the circuit system to output the drive signal.

In some other embodiments, the switch circuit control module controls the switch circuit to be disconnected forcibly through controlling the voltage of drive signal at the input terminal of the switch circuit, so as to realize the purpose that the switch circuit is not controlled by other drive circuits in the circuit system. In one specific example, the switch circuit control module includes a driver, and the driver is connected with the input terminal of the switch circuit and is configured to control a drive unit of the switch circuit not to output a drive signal to the switch circuit when the first control signal is received, until the second control signal is received. Wherein, the driver includes a driving amplifier, and the switch circuit can be controlled to turn on or turn off depending on that the driving amplifier outputs the drive signal or does not output correspondingly. With the switch circuit including a switch unit as an example, the driver is connected with the input terminal of the switch unit, when the driver receives the first control signal, the driver does not output a drive signal to the switch circuit, and when the driver receives the second control signal, the driver outputs a drive signal to the switch circuit, or a control signal of other circuits in the circuit system can be served as a drive signal and output to the switch circuit. It should be noted that, the driver and the drive unit contained in the switch circuit can be the same one, or the driver may be a front stage driving circuit for the drive unit contained in the switch circuit.

Figure 7:
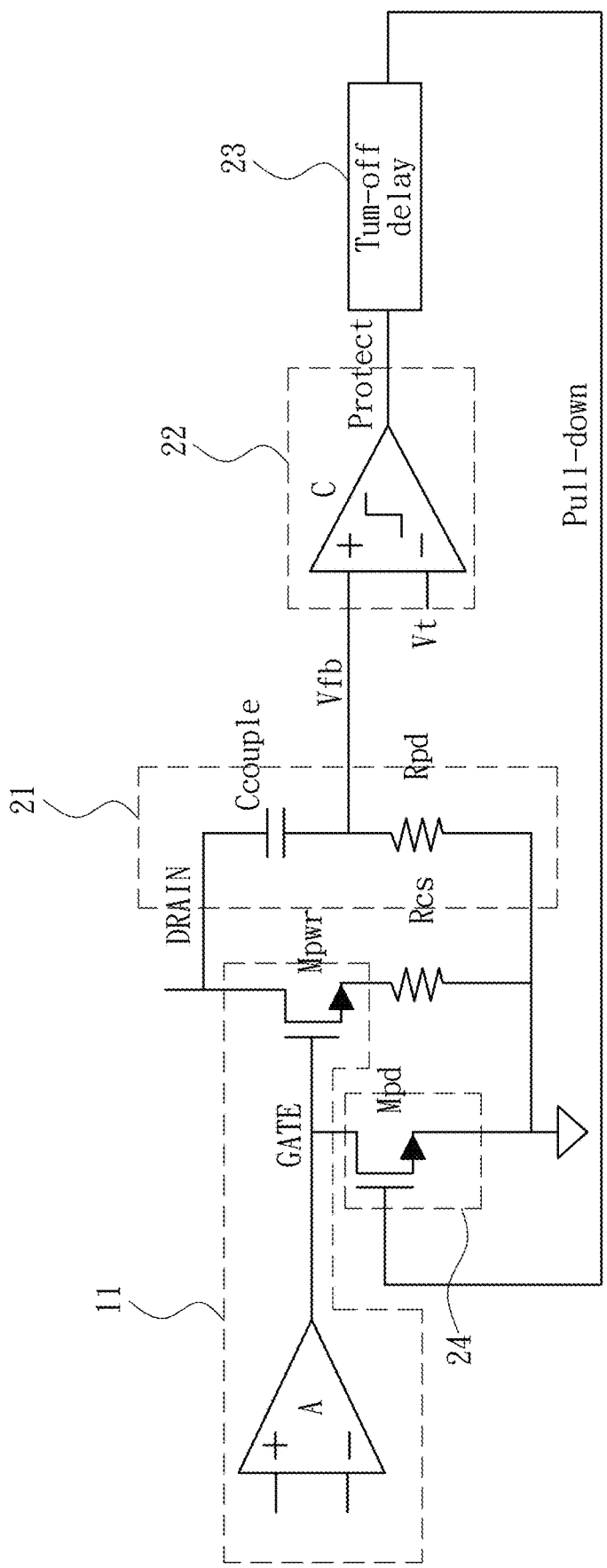
FIG. 7, FIG. 8 and FIG. 9 show circuit structural diagrams of the protection circuit in the present application in different examples.

Based on the protection circuit described in the above examples, please refer to FIG. 7 which shows a circuit structural diagram of the protection circuit in one example. Wherein, as shown in the figure, the switch circuit 11 includes a drive unit A and a switch power tube Mpwr, and the protection circuit includes: an acquisition module 21, a detection module 22, a delay control module 23 and a switch circuit control module 24. Wherein, the acquisition module includes a high-pass filter which is constituted by a capacitor Ccouple and a resistor Rpd, wherein, one terminal of the capacitor Ccouple is connected with a drain of the switch power tube Mpwr, and the other terminal outputs detection signal Vfb. The detection module includes a comparator C, the positive input terminal of the comparator C receives detection signal Vfb, a negative input terminal thereof receives an warning voltage threshold Vt, and an output terminal thereof outputs detection result Protect level signal. The delay control module is configured to extend the time duration in which the switch circuit is in forcible non-conductive state, and can also be referred as Turn-off delay module. The delay control module includes a timer and a logic device group, wherein, the logic device group includes a first logic device group and a second logic device group (both are not shown in the figure), the first logic device group controls the timer to start a delay timing or to reset based on the received Protect level signal, and the second logic device group outputs the first control signal and the second control signal based on the logic configuration between the received Protect level signal and the overtime signal output by the timer. The switch circuit control module includes a voltage regulator (MOSFET Mpd) which is connected with the MOSFET Mpwr. In the duration of the first control signal, the switch power tube Mpd is turned on and grounded, and the gate of the switch power tube Mpwr is always at a low level, such that Mpwr is forcibly controlled in forcible non-conductive state; and in the duration of the second control signal, the switch power tube Mpd is turned off, such that Mpwr is released from the forcible non-conductive state, and the switch power tube Mpwr performs turned-on or turned-off operations while being driven by a drive unit A.

Figure 8:
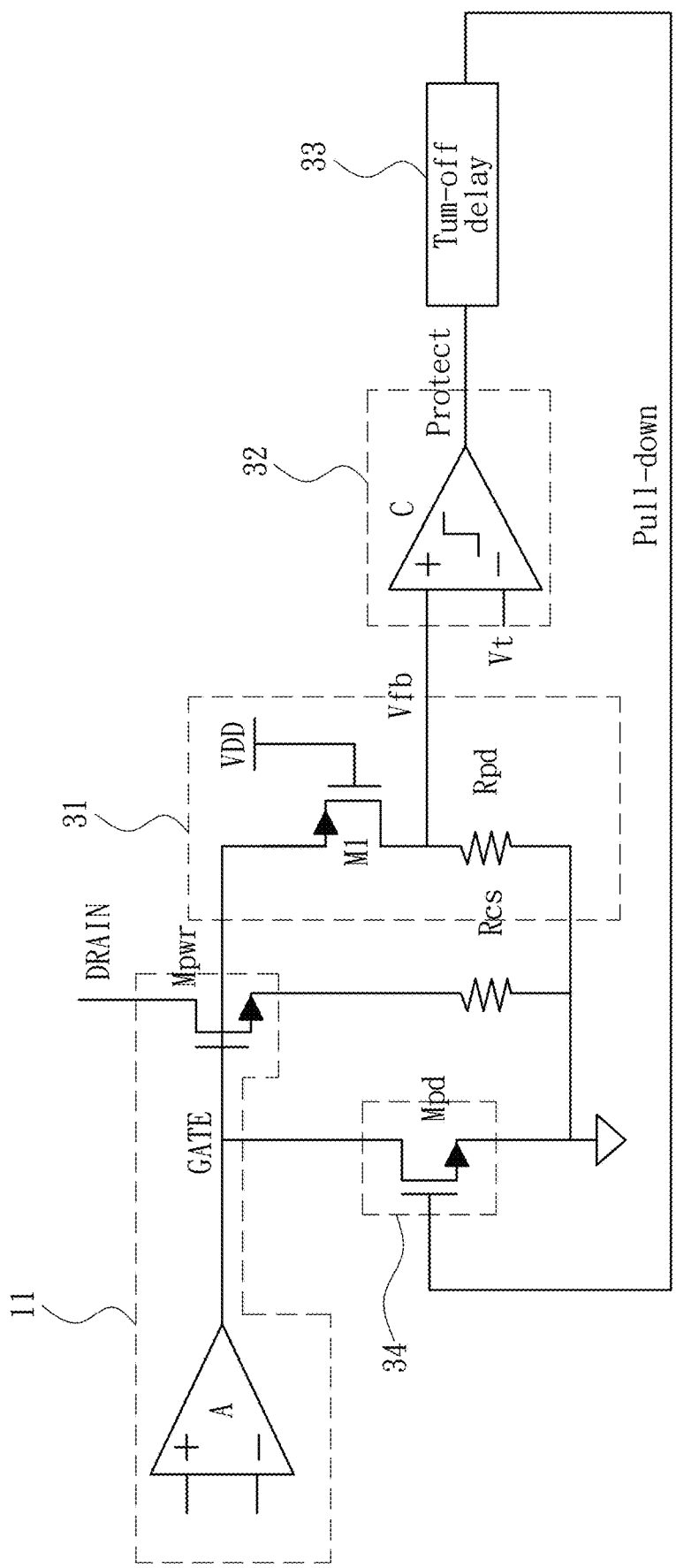

Based on the protection circuit described in the above examples, please refer to FIG. 8 which shows a circuit structural diagram of the protection circuit in one specific example. Wherein, as shown in the figure, the switch circuit 11 includes a drive unit A and a switch power tube Mpwr, and the protection circuit includes: an acquisition module 31, a detection module 32, a delay control module 33 and a switch circuit control module 34. Wherein, the acquisition module includes a switch device (a switch power tube M1 and a resistor Rpd), wherein, the source of the switch power tube M1 is connected with the gate of the switch power tube Mpwr, the gate of the switch power tube M1 is connected with a constant voltage source (VDD), and the drain of the switch power tube M1 outputs detection signal Vfb. The detection module includes a comparator C, the positive input terminal of the comparator C receives detection signal Vfb, a negative input terminal thereof receives an warning voltage threshold Vt, and an output terminal thereof outputs detection result Protect level signal. The delay control module includes a timer and a logic device group, wherein, the logic device group includes a first logic device group and a second logic device group (both are not shown in the figure), the first logic device group controls the timer to start a delay timing or to reset based on the received Protect level signal, and the second logic device group outputs the first control signal and the second control signal based on the logic configuration between the received Protect level signal and the overtime signal output by the timer. The switch circuit control module includes a voltage regulator (switch power tube Mpd) which is connected with the switch power tube Mpwr. In the duration of the first control signal, the switch power tube Mpd is turned on and grounded, and the gate of the switch power tube Mpwr is always at a low level, such that Mpwr is forcibly controlled in forcible non-conductive state; and in the duration of the second control signal, the switch power tube Mpd is turned off, such that Mpwr is released from the forcible non-conductive state, and the switch power tube Mpwr performs turned-on or turned-off operations while being driven by a drive unit A.

Figure 9:
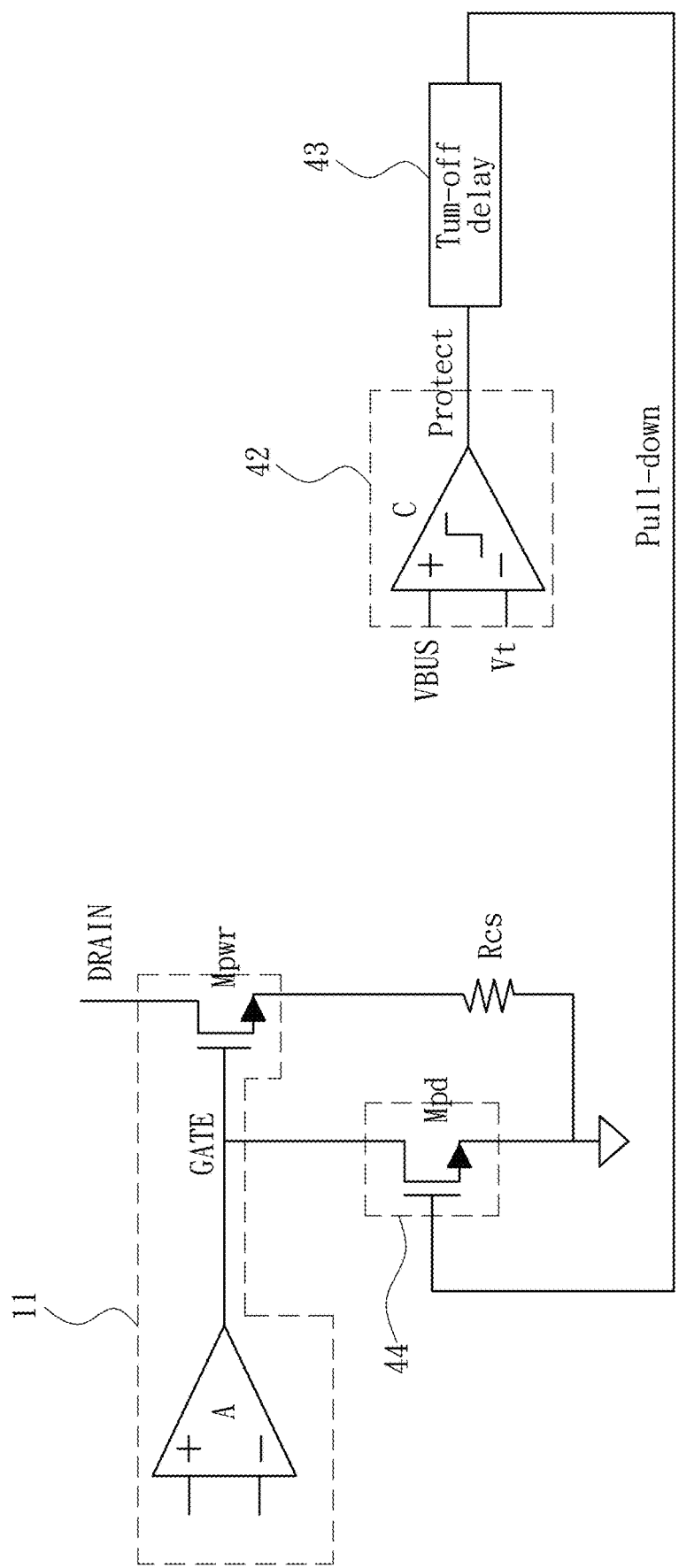

Based on the protection circuit described in the above examples, please refer to FIG. 9 which shows a circuit structural diagram of the protection circuit in one specific example. Wherein, as shown in the figure, the switch circuit 11 includes a drive unit A and a switch power tube Mpwr, and the protection circuit includes: an acquisition module, a detection module 42, a delay control module 43 and a switch circuit control module 44. Wherein, the acquisition module includes a wire which is connected to a load, so as to sample voltage signal VBUS of the power supply bus and the voltage signal VBUS is served as the detection signal. In another example, the acquisition module includes a sampling resistor which is connected to a load, so as to sample voltage signal reflecting the voltage signal VBUS, and the sampled voltage signal reflecting the voltage signal VBUS is served as the detection signal. The detection module includes a comparator C, a positive input terminal of the comparator C receives detection signal VBUS, a negative input terminal thereof receives an warning voltage threshold Vt, and an output terminal thereof outputs detection result Protect level signal. The delay control module includes a timer and a logic device group, wherein, the logic device group includes a first logic device group and a second logic device group (both are not shown in the figure), the first logic device group controls the timer to start a delay timing or to reset based on the received Protect level signal, and the second logic device group outputs the first control signal and the second control signal based on the logic configuration between the received Protect level signal and the overtime signal output by the timer. The switch circuit control module includes a voltage regulator (switch power tube Mpd) which is connected with the switch power tube Mpwr. In the duration of the first control signal, the switch power tube Mpd is turned on and grounded, and the gate of the switch power tube Mpwr is always at a low level, such that Mpwr is forcibly controlled in forcible non-conductive state; and in the duration of the second control signal, the switch power tube Mpd is turned off, such that Mpwr is released from the forcible non-conductive state and the switch power tube Mpwr performs turned-on or turned-off operations while being driven by a drive unit A.

It should be noted that, the circuit structural diagrams of the above protection circuit are merely exemplary, rather than limiting the structure of the circuit. In fact, the modules which are divided in each example can be replaced according to the other examples in the above description or can be improved based on the technology, and the constituted circuit structure can be deemed as specific example under the technical idea of the present application.

It should be noted that, those skilled in the art should understand that the circuit structure of the protection circuit under the technical idea of the present application is not merely limited to a detection unit and a control unit. In fact, according to the technical idea of the present application, the protection circuit can include a digital conversion unit and a processing unit, digital processing can be performed on the acquired detection signal by means of the digital conversion unit, and then control logic processing can be performed on the digital processed detection signal by means of the processing unit, and corresponding control signal is output, such that when the load is interfered by ring wave during the period in which the load can operate, the switch circuit can be controlled in time to maintain a forcible non-conductive state within a protection period.

The present application further provides a chip, and the chip is configured to provide a protection circuit for a circuit system in which a load is driven by a switch circuit. The protection circuit is as shown in FIG. 1 to FIG. 9 and related description thereof, and will not be described herein.

Figure 10:
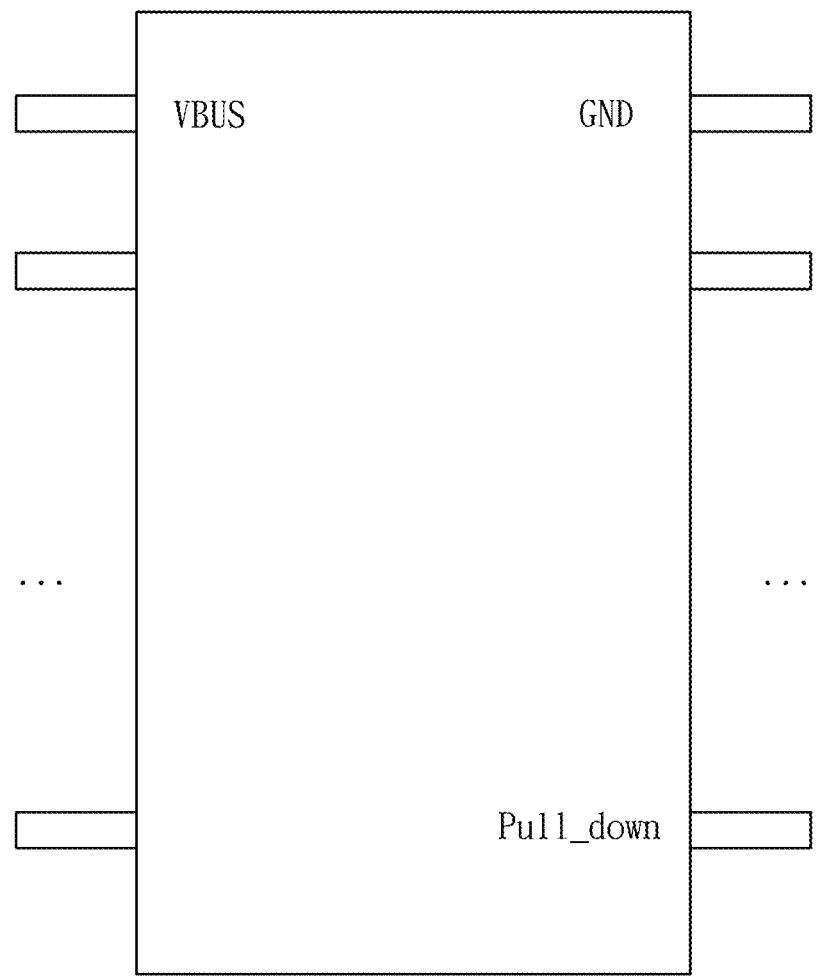
FIG. 10 shows a schematic diagram of chip package containing the above protection circuit in the present application.

Please refer to FIG. 10 which shows a schematic diagram of chip package containing the above protection circuit. The chip includes multiple pins, wherein, the pins include a first pin (Vft or VBUS), used to acquire a voltage signal reflecting the voltage of the power supply bus on which the load is located, a second pin (GND) used to be grounded, and a third pin (Pull_down) used to output a control signal to the switch circuit. When the constant voltage source in the above protection circuit is an external power source, the chip further includes a fourth pin (VDD) used to connect the constant voltage source. Wherein, the first pin can be connected to the power supply bus in the to-be-protected circuit system or a corresponding access end of the switch circuit based on FIG. 1 to FIG. 9 and corresponding descriptions thereof. For example, the first pin is connected with the access end of the load, so as to acquire voltage signal VBUS of the power supply bus. For another example, the first pin is connected with the control terminal of the switch unit in the switch circuit, so as to acquire voltage signal reflecting the power supply bus voltage (the change of voltage of the power supply bus). The protection circuit is connected with the control terminal or the input terminal of the switch circuit via the third pin (Pull_down). For example, the protection circuit is connected with the control terminal (for example, the gate) of the switch unit contained in the switch circuit via the third pin, or connected with the control terminal (for example, the enable end) of the drive unit contained in the switch circuit via the third pin.

In some embodiments, the protection circuit can be integrated into a chip together with a linear compensation circuit. Wherein, the linear compensation circuit is configured to output a linear compensation signal to the switch circuit based on an acquired voltage signal reflecting the power supply bus voltage, such that the switch circuit can drive the load based on the linear compensation signal during a period in which the switch circuit is not in a forcible non-conductive state. Herein, the linear compensation circuit can include a sampling unit and a line voltage generation unit, wherein, the sampling unit is connected with the power supply bus, and converts the voltage signal of the power supply bus into a detection signal which can reflect the voltage signal, and outputs the detection signal to the line voltage generation unit. And based on a reference voltage, the line voltage generation unit outputs a linear voltage compensation signal to the switch circuit, wherein the changes of the linear voltage compensation signal and the changes of the detection signal are opposite. Wherein, the switch circuit is configured to control the power supply bus to be in a conductive or non-conductive state. In some embodiments, the linear compensation circuit described in the U.S. patent application Ser. No. 16/024,001 can herein incorporated by reference. Correspondingly, besides including the first pin, the second pin and the third pin mentioned above, the chip which is integrated with the protection circuit and the linear voltage compensation circuit further includes a fifth pin (CS) used to sample a voltage signal of the power supply bus, and a sixth pin used to be connected with the input terminal of the switch circuit to output the linear compensation signal (Vref). Wherein, in order to improve integration level of the protection circuit and the linear compensation circuit, the protection circuit and the linear compensation circuit can share the pins on the chip.

For example, the linear compensation circuit uses the first pin (VBUS) to sample voltage signal of the power supply bus; for another example, the protection circuit and the linear compensation circuit share the second pin (GND) and the fourth pin (VDD).

In some other embodiments, the protection circuit, the linear compensation circuit and at least part of the switch circuit are integrated in a chip. In one specific example, the drive unit in the switch circuit is integrated in the chip, and according to the connection between the protection circuit and the drive unit in one example, the output terminal of the protection circuit is connected with the control terminal of the drive unit, and the pins of the chip include the above first pin, the second pin, the fifth pin and a seventh pin used to connect the output terminal of the drive unit with the switch unit. In another specific example, the drive unit and the switch unit in the switch circuit are integrated in the chip, and according to the connection between the protection circuit and the drive unit and the switch unit in one example, the output terminal of the protection circuit is connected with the control terminal of the switch unit. The pins of the chip include the above first pin, the second pin, the fifth pin and an eighth pin and a ninth pin used to connect the input terminal and the output terminal of the switch unit to the power supply bus.

With LED lighting device as an example, the LED lighting device includes an LED light (namely, the load), the rectifying circuit, the switch circuit, the linear compensation circuit and the protection circuit. Wherein, the switch circuit, the linear compensation circuit and the protection circuit are integrated in a chip. The chip, the rectifying circuit and the LED light are all connected to the power supply bus, wherein, the linear compensation circuit and the protection circuit in the chip are connected with the power supply bus via a pin (VBUS) to acquire a voltage signal, and the linear compensation circuit and the protection circuit in the chip are grounded via another pin (GND); and the input terminal and the output terminal of the switch circuit are connected to the power supply bus via corresponding pins, such that the conductive or non-conductive of the power supply bus is controlled by the switch circuit.

Figure 11:
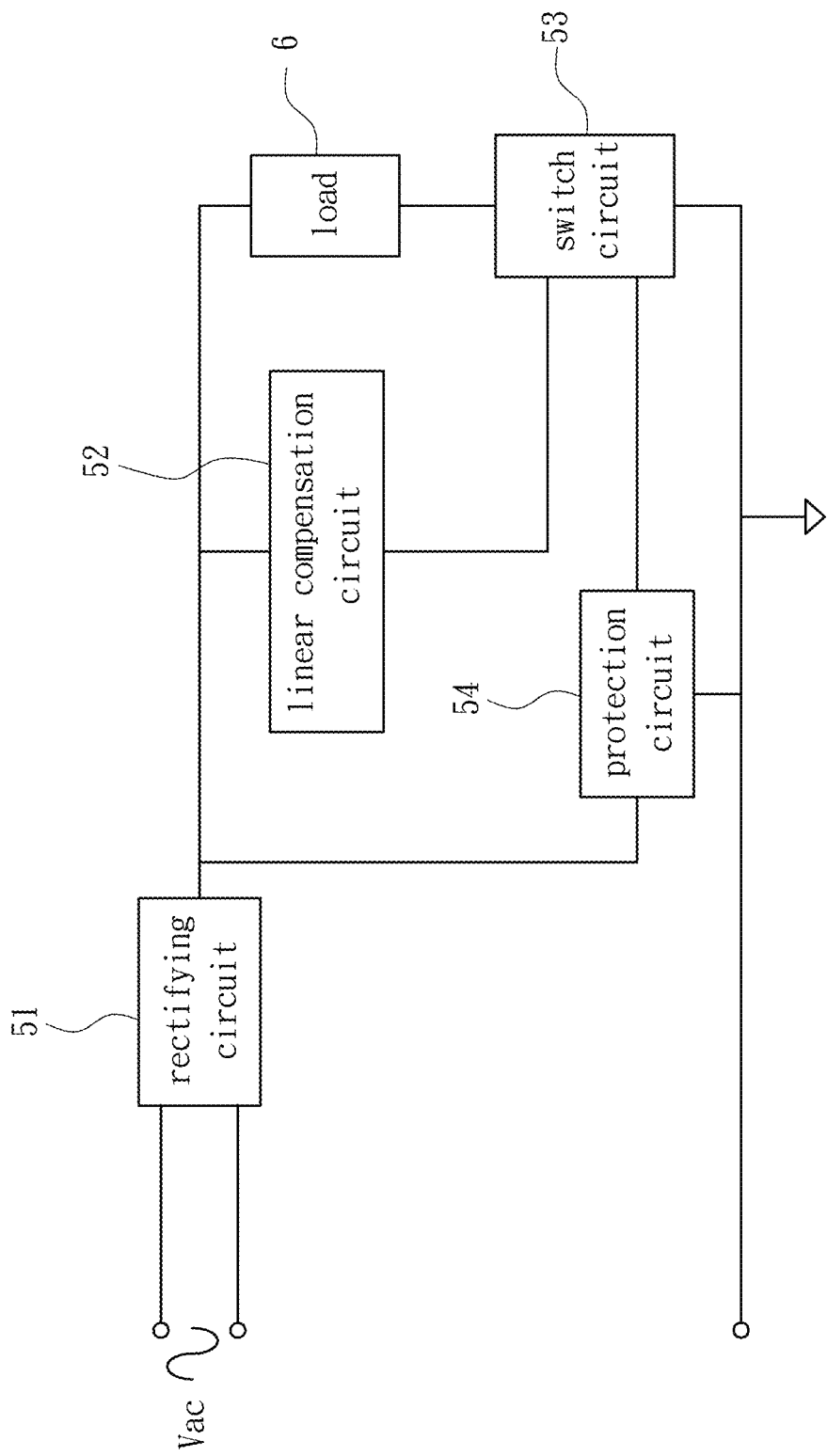
FIG. 11 shows a structural schematic diagram of the drive system in the present application in one embodiment.

Please refer to FIG. 11 which shows a structural schematic diagram of the drive system in the present application in one embodiment. The drive system includes a rectifying circuit 51, a switch circuit 53, a linear compensation circuit 52 and a protection circuit 54.

The rectifying circuit 51 is configured to rectify an external AC and output the rectified external AC to the power supply bus on which the load 6 is located. For example, the rectifying circuit 51 includes a rectifier bridge constituted by four diodes, and the rectifier bridge converts waveform of the AC into waveform of the power supply which takes half of a power frequency cycle as a cycle.

The switch circuit 53 is arranged on the power supply bus and is configured to control the power supply bus to be in a conductive or non-conductive state. Wherein, the switch circuit 53 includes a drive unit and a switch unit. For example, the drive unit includes a driving amplifier, an input terminal of the driving amplifier receives a drive control signal output form the drive circuit (linear compensation circuit 52), and an output terminal thereof is connected with the switch unit. The switch unit for example includes a switch power tube, a gate of the switch power tube is connected with the output terminal of the driving amplifier, and a drain and a source are connected with the power supply bus.

The output terminal of the linear compensation circuit 52 is connected with the input terminal of the drive unit in the switch circuit 53, and is configured to output a linear compensation signal to the switch circuit 53 based on an acquired electric signal reflecting a power supply bus voltage, such that the switch circuit 53 drives the load based on the linear compensation signal during a period in which the switch circuit is not in a forcible non-conductive state. Wherein, the linear compensation circuit 52 is configured to output a linear compensation signal to the switch circuit 53 based on an acquired electric signal reflecting a power supply bus voltage, such that the switch circuit 53 drives the load based on the linear compensation signal during a period in which the switch circuit is turned on, until the switch circuit is turned off. Herein, the linear compensation circuit 52 detects a signal reflecting a change of the power supply bus voltage and generates a line voltage compensation signal, and provides the line voltage compensation signal to the drive unit contained in the switch circuit, such that the drive unit can adjust a current flowing through the switch unit based on a voltage error between the line voltage compensation signal and an electric signal which reflects the current flowing through the switch circuit, so as to provide a stable power supply to the load. Wherein, the line voltage compensation signal is obtained based on a signal reflecting the power supply bus voltage which has a preset linear relationship with the line voltage compensation signal. In some embodiments, the linear compensation circuit can include a sampling unit and a line voltage generation unit, wherein, the sampling unit is connected with the power supply bus, and converts the voltage signal of the power supply bus into a detection signal which can reflect the voltage signal, and outputs the detection signal to the line voltage generation unit. And based on a reference voltage, the line voltage generation unit outputs a linear voltage compensation signal to the switch circuit 53, wherein the changes of the linear voltage compensation signal and the changes of the detection signal are opposite. Wherein, the switch circuit 53 is configured to control the power supply bus to be in the conductive or non-conductive state. In some embodiments, the linear compensation circuit 52 can also be a circuit example described in the U.S. patent application Ser. No. 16/024,001, which can herein incorporated by reference.

The protection circuit 54 is provided with an output terminal used to connected with the switch circuit 53, and is configured to control the switch circuit 53 to maintain the forcible non-conductive state within a protection period. Herein, the protection circuit 54 is as shown in FIG. 1 to FIG. 9 and related description, and will not be described in detail herein. In some embodiments, the protection circuit 54 acquires a voltage signal reflecting the power supply bus voltage and converts the acquired voltage signal into a detection signal, and controls the control terminal or input terminal of the switch circuit to maintain a forcible non-conductive state within a protection period based on the detection of the detection signal. Wherein, a control terminal of the switch circuit may be a control terminal (such as the GATE terminal) of the switch unit contained in the switch circuit, or may be an enable terminal of the drive unit. For example, in the case of the control terminal of the switch circuit is the control terminal of the switch unit contained in the switch circuit, during the protection period, the switch unit is disconnected forcibly and directly. For another example, in the case of the control terminal of the switch circuit is the enable terminal of the drive unit contained in the switch circuit, during the protection period, the drive unit is being forced not to output an effective drive signal, thus the switch unit is disconnected forcibly. The input terminal of the switching circuit may be an electric connection for receiving a linear compensation signal. For example, during the protection period, the input terminal of the switch circuit is grounded forcibly through the protection circuit, or the input terminal of the switch circuit is disconnected from the linear compensation circuit forcibly through the protection circuit, so that the drive unit cannot output an effective drive signal, thus the switch unit is disconnected forcibly. In another specific example, the protection circuit 54 samples a voltage signal from the power supply bus and converts the signal into a detection signal. And based on the detection of the detection signal, the protection circuit 54 controls the control terminal of the line voltage compensation circuit not to output a line voltage compensation signal forcibly during the protection period, thus the switch circuit is disconnected forcibly.

Figure 12:
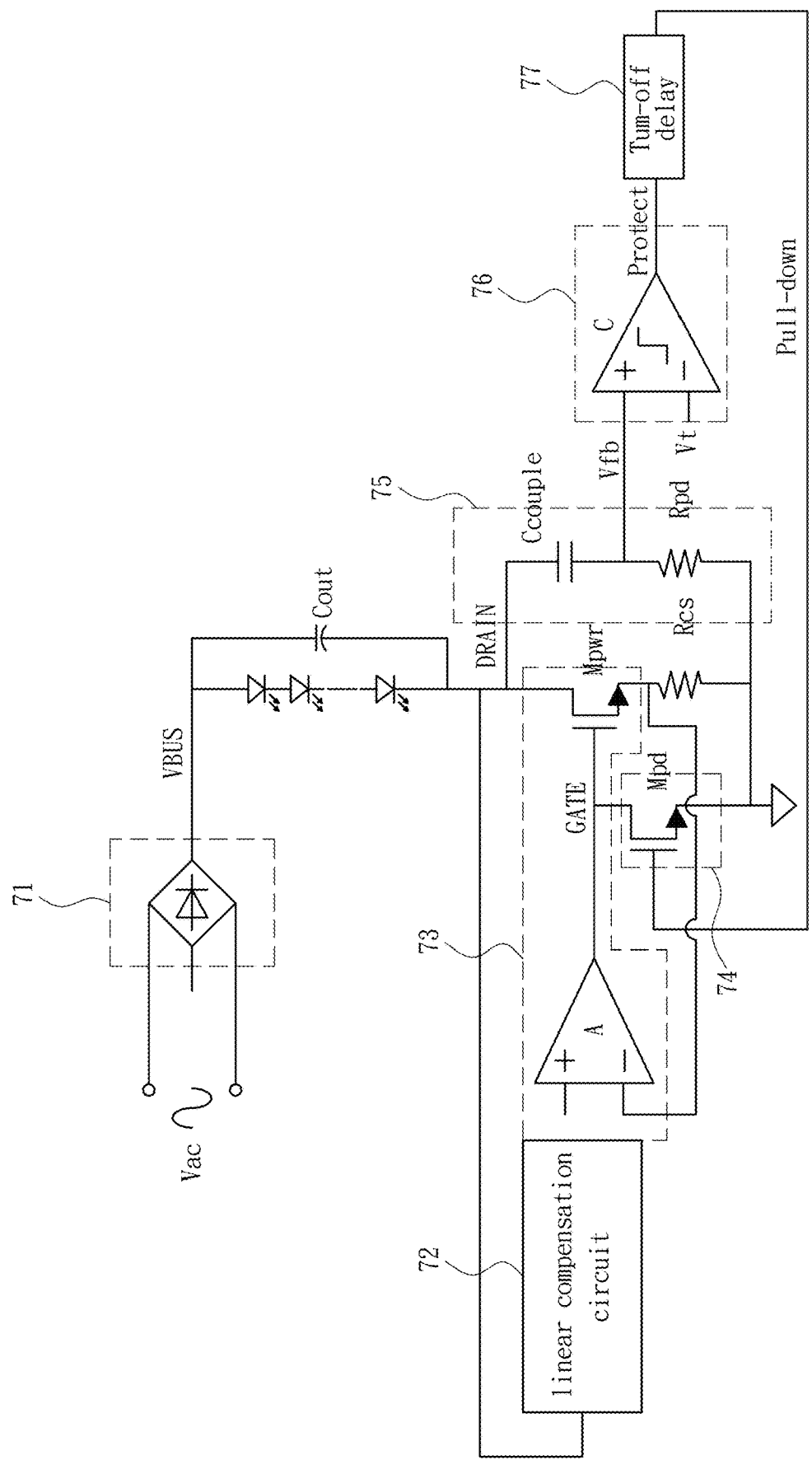
FIG. 12 shows a circuit schematic diagram of the drive system in the present application in one embodiment.

With LED lighting device as an example, please refer to FIG. 12 which shows a circuit schematic diagram of the drive system in one embodiment. The LED lighting device includes an LED light (namely, the load), a rectifying circuit 71, a switch circuit 73, a linear compensation circuit 72 and a protection circuit (74, 75, 76 and 77), and so on. Wherein, the rectifying circuit rectifies the received AC and outputs the rectified AC to the power supply bus. The switch circuit includes a drive unit and a switch unit, wherein, the drive unit includes a driving amplifier A, the switch unit includes a switch power tube Mpwr, an output terminal of the driving amplifier A is connected with the gate of the switch power tube Mpwr, and the drain and the source of the switch power tube Mpwr are connected to the conductive loop connected to the power supply bus. A sampling terminal of the linear compensation circuit is connected with the power supply bus via a voltage division unit, an output terminal of the linear compensation circuit is connected with one input terminal of the driving amplifier A, while the other input terminal of the driving amplifier A is connected with the source of the switch power tube Mpwr. The input terminal of the protection circuit is connected with the drain of the switch power tube Mpwr, and the output terminal of the protection circuit is connected with the gate of the switch power tube Mpwr.

Wherein, the protection circuit includes an acquisition module 75, a detection module 76, a delay control module 77 and a switch circuit control module 74. Wherein, the acquisition module includes a high-pass filter which is constituted by a capacitor Ccouple and a resistor Rpd, wherein, one terminal of the capacitor Ccouple is connected with a drain of the switch power tube Mpwr, and the other terminal outputs detection signal Vfb. The detection module includes a comparator C, the positive input terminal of the comparator C receives detection signal Vfb, a negative input terminal thereof receives an warning voltage threshold Vt, and an output terminal thereof outputs detection result Protect level signal. The delay control module is configured to extend the time duration in which the switch circuit is in forcible non-conductive state, and can also be referred as Turn-off delay module. The delay control module includes a timer and a logic device group, wherein, the logic device group includes a first logic device group and a second logic device group (both are not shown in the figure), the first logic device group controls the timer to start a delay timing or to reset based on the received Protect level signal, and the second logic device group outputs the first control signal and the second control signal based on the logic configuration between the received Protect level signal and the overtime signal output by the timer. The switch circuit control module includes a voltage regulator (MOSFET Mpd) which is connected with the MOSFET Mpwr. In the duration of the first control signal, the switch power tube Mpd is turned on and grounded, and the gate of the switch power tube Mpwr is always at a low level, such that Mpwr is forcibly controlled in forcible non-conductive state; and in the duration of the second control signal, the switch power tube Mpd is turned off, and the linear compensation circuit outputs a linear compensation signal to a driving amplifier A. The driving amplifier A outputs a drive signal to the gate of the switching power tube Mpwr based on the linear compensation signal and the electric signal which reflects the current flowing through the switch circuit, for example, the electric signal which reflects the current flowing through the switch circuit can be a voltage of a resistor Rcs connected to the switch circuit; and when the drive signal is insufficient to turn on the switching power tube Mpwr, the switching power tube Mpwr is turned off.

Figure 13:
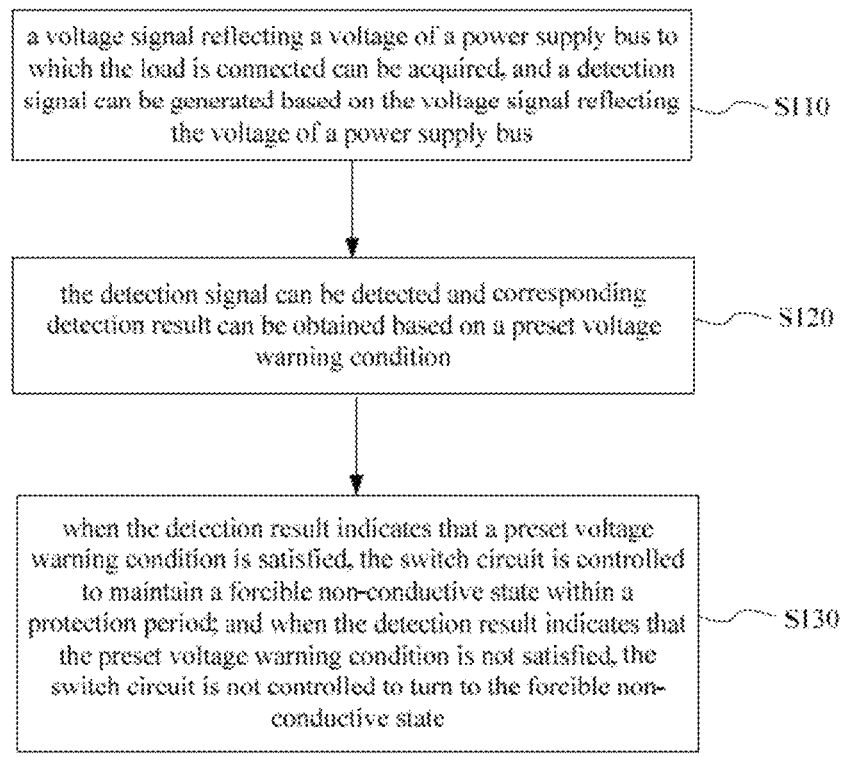
FIG. 13 shows a flow chart of a method for protecting a circuit in the present application.

Please refer to FIG. 13 which shows a flow chart of a method for protecting a circuit. The circuit protection method can be implemented by any of the above protection circuits, or can be implemented by any other protection circuits which can implement the protection method which will not be recited herein.

In step S110, a voltage signal reflecting a voltage of a power supply bus to which the load is connected can be acquired, and a detection signal can be generated based on the voltage signal reflecting the voltage of a power supply bus.

In step S120, the detection signal can be detected and corresponding detection result can be obtained based on a preset voltage warning condition.

Herein, corresponding to the detection unit in the above protection circuit, the detection unit includes circuit modules connected to the electric connection positions at which the voltage signals reflecting the power supply bus voltage are acquired, and the detection unit converts the acquired voltage signal into a detection signal, and detect the detection signal and obtain a detection result based on a preset voltage warning condition. Wherein, the electric connection position can be a position at which the input terminal of the protection circuit is connected with the electronics which is on the conductive loop connected to the power supply bus. For example, the electric connection position can be located on the power supply bus between the switch circuit and the load, or can be an access end of the load which is accessed to the power supply bus. For another example, the electric connection position can be a control terminal of the switch circuit, or an output terminal of a sampling circuit which is configured to sample voltage signal of the power supply bus in a circuit system. In relation to the electric connection position, the voltage warning condition includes an warning voltage threshold which is preset according to the acquired voltage signal reflecting the voltage of the power supply bus, in other words, the voltage warning condition can be an warning voltage threshold which is preset according to a normal voltage range of the electric connection position.

In some embodiments, the step S110 includes a step of acquiring an instantaneous voltage signal of the power supply bus and generating a detection signal corresponding to the instantaneous voltage signal.

As shown in FIG. 3, the detection unit includes an acquisition module and a detection module. Wherein, the acquisition module is connected with a power supply bus and is configured to acquire an instantaneous voltage signal of the power supply bus and output a detection signal corresponding to the instantaneous voltage signal. Herein, the acquisition module is connected with any position on the power supply bus, for example, connected with an access end of the load. In order to prevent ring wave from breaking down the semiconductor device in the switch circuit, the acquisition module can also connect with the input terminal of the switch circuit which is accessed to a conductive loop connected to the power supply bus.

In one specific example, the acquisition module receives an instantaneous voltage signal of the power supply bus directly and in real time through a wire, and serves the received instantaneous voltage signal as the detection signal and outputs to the detection module. In another specific example, the acquisition module includes a sampling resistor, the voltage of the power supply bus is divided by the sampling resistor, and based on an impedance of the sampling resistor, the corresponding voltage signal after voltage division is served as the detection signal and output to the detection module.

In some other embodiments, the step S110 includes a step of acquiring a detection signal reflecting a change of the power supply bus voltage from the switch circuit.

The acquisition module is connected with the switch circuit, and is configured to acquire the voltage signal reflecting the power supply bus voltage and generate the detection signal reflecting change of the power supply bus voltage. Herein, according to the actual circuit design, the acquisition module can be connected with the input terminal, the output terminal or the control terminal of the switch unit contained in the switch circuit. For example, the switch unit can be a gate drive NMOS tube, and the acquisition module is connected with the drain, the source or the gate of the NMOS tube.

In one specific example, the acquisition module is configured to sample a peak interval of the instantaneous voltage signal of the power supply bus from the switch circuit, so as to acquire a voltage signal reflecting magnitude change of voltage of the power supply bus. For example, the acquisition module includes a switch device, the control terminal of the switch device is connected with the switch circuit, and the output terminal of the switch device outputs the detection signal. For another example, the input terminal of the switch device can be connected with a constant voltage (VDD), the control terminal of the switch device is connected with the input terminal or the control terminal of the switch unit contained in the switch circuit, and the output terminal of the switch device is connected with the detection module. When the voltage signal reflecting the power supply bus voltage received by the control terminal of the switch device reaches the conductive condition at which the switch device is in conductive state, the switch device is turned on, correspondingly, the detection signal output by the output terminal of the switch device contained in the acquisition module to the detection module is an effective signal (such as high level signal, i.e., voltage VDD), otherwise, the switch device is turned off, and the detection signal output by the switch device to the detection module is a non-effective signal (such as a low level signal). Taking the switch device being a switch power tube M1 as an example, according to the actual connection of the switch device contained in the acquisition module in the circuit system, the gate of the switch device is the input terminal, the drain is the control terminal, the source is the output terminal, wherein, the gate of the switch device is connected with a constant voltage (VDD), the source is connected with the control terminal (for example, gate) of the switch unit in the switch circuit, and the drain is connected with the detection module. When the voltage signal reflecting the power supply bus voltage is received by the source terminal of the switch device, the detection signal output by the output terminal of the switch device to the detection module is an instantaneous voltage signal of the control terminal (for example, gate) of the switch unit in the switch circuit.

In another specific example, the acquisition module is configured to sample a voltage signal reflecting the change of the power supply bus voltage in the high-frequency intervals from the switch circuit, and output corresponding detection signal. For example, the acquisition module includes a high-pass filter, one terminal of the high-pass filter is connected with the switch circuit to acquire the voltage signal reflecting the power supply bus voltage, and the other terminal of the high-pass filter is connected with the detection module and outputs the detection signal. For example, the high-pass filter can be a filter, contains a capacitor and a resistor. For another example, the high-pass filter can be a filter which contains a capacitor, a resistor and an operational amplifier. With the high-pass filter containing a capacitor and a resistor as an example, one terminal of the capacitor is connected with the input terminal (or the control terminal) of the switch unit in the switch circuit, the other terminal of the capacitor is used as the output terminal, the resistor is connected between the output terminal of the high-pass filter and the ground, and when ring wave is superimposed on the AC input power and provided to the power supply bus, the high-pass filter outputs a detection signal containing ring wave.

In some embodiments, the step S120 includes a step of comparing the voltage of the detection signal with the preset warning voltage threshold by a comparator and outputting corresponding detection result. Herein, the detection module includes a comparator, and one input terminal thereof receives the detection signal, and the other input terminal receives an warning voltage threshold; the comparator compares the voltage of the detection signal with the warning voltage threshold and outputs corresponding detection result. For example, the positive input terminal of the comparator is connected with the output terminal of the acquisition module to receive the detection signal, and the negative input terminal of the comparator is connected with a constant voltage source to receive an warning voltage threshold. When the voltage of the detection signal is greater than or equal to the warning voltage threshold, the comparator outputs a high level to represent the detection result which indicates the ring wave is detected; otherwise, the comparator outputs a low level to represent the detection result which indicates the voltage of the power supply bus is within a normal range.

It should be noted that, those skilled in the art should understand that, according to the actual circuit design, voltage of detection signal received by the positive input terminal and an warning voltage threshold received by the negative input terminal of the comparator can be interchanged, and corresponding detection results are represented by the level signals opposite to these in the above example, and those will not be described in detail herein.

It should also be noted that, those skilled in the art can change or replace at least part of the circuit modules in the detection unit according to the detection manners of the above examples, such that the circuit structures which output a detection result conforming to ring wave detection should be deemed as specific examples within the scope of the present application, and these circuit structures will not be described in detail herein. Wherein, according to the circuit structure, signal forms of the output detection result can be different, for example, the detection result can be represented in a form of digital signal.

The detection result is output to the control unit in the protection circuit to perform step S130.

In step S130, when the detection result indicates that a preset voltage warning condition is satisfied, the switch circuit is controlled to maintain a forcible non-conductive state within a protection period; and when the detection result indicates that the preset voltage warning condition is not satisfied, the switch circuit is not controlled to turn to the forcible non-conductive state.

Herein, step S130 corresponds to the above performing process of the control unit in the protection circuit. The control unit determines whether to turn off the switch circuit forcibly based on the detection result, so as to protect the whole electronics from being damaged because of instantaneous, high-frequency and large current. In other words, when the received detection result indicates that the preset voltage warning condition is satisfied, the control unit will output an effective control signal, which will turn off the switch circuit and maintain the switch circuit in a forcible non-conductive state within a protection period; and when the received detection result indicates that the preset voltage warning condition is not satisfied, the control unit will output a non-effective control signal, such that the switch circuit state shall be controlled under the control signal output from the drive circuit included in the circuit system. Wherein, the protection period is used to prevent interference of continuous ring wave on the electronics. The protection period can be of a constant time duration, or can be of a time duration which can be adjusted along with the change of the detection result acquired in real time.

In some embodiments, the step S130 includes a step of controlling the switch circuit to turn to and maintain the forcible non-conductive state when the detection result indicates that the preset voltage warning condition is satisfied, and starting a delay timing, and releasing the switch circuit from the forcible non-conductive state after the delay timing exceeds the protection period.

In order to perform the above step, the control unit can include a logic device group, a timer and a switch circuit controller. Wherein, the timer is used to time at least part of the time duration in the protection period, and output an overtime signal when the timing is exceeded. Based on the requirements of actual logic design, the logic device group can include at least one logic device, and corresponding logic configuration can be realized through electrical connection among logic devices. Wherein, the logic device includes but is not limited to either of an AND gate, an OR gate, a NAND gate, a NOT gate, an encoder, a decoder or a selector. According to the detection result and the overtime signal output by the timer, the logic device group is used to output a control signal based on which the switch circuit can be controlled. Based on the control signal output from the control unit, the switch circuit is turned off and maintain a forcible non-conductive state in a protection period, or release from the forcible non-conductive state.

In some conditions, the switch circuit can only be controlled by the protection circuit, when the control unit controls the switch circuit to turn to the forcible non-conductive state, the switch circuit cut off the conductive loop of the power supply bus, such that the power supply bus cannot provide power to the load, and when the control unit controls the switch circuit to release from the forcible non-conductive state, such that the switch circuit can be controlled by drive circuit, if the switch circuit is in conductive state, the power supply bus will be in conductive state through the switch circuit, such that the power supply bus can provide power to the load. In other conditions, the switch circuit is controlled by the circuit system, when the control unit controls the switch circuit to turn to a forcible non-conductive state, the conductive loop of the power supply bus is disconnected forcibly through the switch circuit, and when the control unit controls the switch circuit to release from the forcible non-conductive state, the switch circuit is not disconnected forcibly, and the conductive/non-conductive operation of the switch circuit can be performed responding to the control signal output by the drive circuit of the circuit system, such that the load can operate under the power supply control of circuit system on the power supply bus.

In some embodiments, as shown in FIG. 3, the control unit includes a delay control module and a switch circuit control module.

The delay control module is configured to perform the following steps: outputting a first control signal (effective control signal) when the received detection result indicates that the preset voltage warning condition is satisfied, starting a delay timing based on the detection result output by the detection unit, and outputting a second control signal (non-effective control signal) after the timing exceeds the protection period.

Herein, the delay control module can include the above logic device group, a timer and peripheral electronics, and so on; or the delay control module can include digital circuits which are set based on signal or information representing the detection result to realize corresponding processes. The delay control module outputs the first control signal when the received detection result indicates that the preset voltage warning condition is satisfied, wherein, the switch circuit control module can switch the switch circuit into a forcible non-conductive state forcibly based on the first control signal; simultaneously or delayingly, the delay control module can start a delay timing, and output the second control signal after the timing is exceeded, wherein, the switch circuit control module can release the switch circuit from the forcible non-conductive state based on the second control signal, that is, the switch circuit is not disconnected forcibly.

In order to control the time duration of the protection period effectively, in some embodiments, the delay control module can perform the following steps: starting the delay timing when the received detection result indicates that the preset voltage warning condition is satisfied. In some embodiments, the delay control module starts a delay timing when one situation in which the preset voltage warning condition is satisfied is turned to another situation in which the preset voltage warning condition is not satisfied. With the detection result being a level signal as an example, please refer to FIG. 4 which shows waveform schematic diagrams of waveform (DRAIN) of voltage on the input terminal of the switch unit, waveform (Protect) of corresponding detection result and waveform (Pull-down) of corresponding control signal in one embodiment. Wherein, high level signal indicates that the voltage warning condition is satisfied, and low level signal indicates that the voltage warning conditions is not satisfied. The delay control module outputs the first control signal (the high level interval of control signal) when detecting an rising edge of the waveform of detection result, and starts the delay timing when detecting a falling edge of the waveform of detection result, and outputs the second control signal (the low level interval of control signal) after the delay timing exceeds the protection period.

In other embodiments, the delay control module can perform the following steps: outputting the second control signal when the received detection result indicates that the preset voltage warning condition is not satisfied and the delay timing exceeds the protection period. Still with the detection result being a level signal as an example, please refer to FIG. 5 which shows waveform schematic diagrams of waveform (DRAIN) of voltage on the input terminal of the switch unit, waveform (Protect) of corresponding detection result and waveform (Pull-down) of corresponding control signal in another embodiment. Wherein, the high level signal indicates that the voltage warning condition is satisfied, and the low level signal indicates that the voltage warning conditions is not satisfied. The delay control module outputs the first control signal (the high level interval of control signal) when detecting an rising edge of the waveform of detection result, and starts the delay timing when detecting a falling edge of the waveform of detection result, and outputs the second control signal (the low level interval of control signal) when the delay timing exceeds the protection period and the waveform of the detection result is at low level.

In order to prevent the execution of multiple detection caused by continuous fluctuation of ring wave, in still other embodiments, during the period of the delay timing, the delay control module can perform the following steps: restarting a timing based on the received detection result which indicates that preset voltage warning condition is satisfied. Still with the detection result being a level signal as an example, please refer to FIG. 6 which shows waveform schematic diagrams of waveform (DRAIN) of voltage on the input terminal of the switch unit, waveform (Protect) of corresponding detection result and waveform (Pull-down) of corresponding control signal in another embodiment. Wherein, high level signal indicates that the voltage warning condition is satisfied, and low level signal indicates that the voltage warning conditions is not satisfied. The delay control module outputs the first control signal (the high level interval of control signal) when detecting an rising edge A1 of the waveform of detection result, and starts the delay timing when detecting a falling edge B1 of the waveform of detection result. During the period of the delay timing, the delay control module resets the timer when detecting another rising edge A2 and restarts a delay timing when detecting another falling edge B2, and outputs the second control signal (the low level interval of control signal) when the delay timing exceeds the protection period and the waveform of detection result is continuously at low level.

It should be noted that, the above delay control module combines logic devices based on control logics, for example, signal logic combination in any of the above examples can be realized by combining logic gate with logic device of a trigger, and first control signal and second control signal can be output correspondingly according to the detection result and protection period.

The switch circuit control module is connected with the output terminal of the delay control module and the control terminal of the switch circuit, and is configured to control the switch circuit to turn to and maintain a forcible non-conductive state based on the first control signal and release from the forcible non-conductive state based on the second control signal, that is, the switch circuit does not need to maintain in conductive state forcibly.

In some embodiments, the switch circuit control module controls the switch circuit to be turn off forcibly through controlling the voltage at the control terminal of the switch circuit, so as to realize the purpose that the switch circuit is not controlled by other drive circuits in the circuit system. In one specific example, the switch circuit control module includes a voltage regulator, and the voltage regulator is connected with the control terminal of the switch circuit, and is configured to regulate the voltage at the control terminal of the switch circuit based on the first control signal and the second control signal. Wherein, the voltage regulator includes a switch device, and the voltage at the control terminal of the switch circuit is regulated through the turn-on/turn-off of the switch device. The voltages at the control terminal regulated by the voltage regulator differ from each other according to valid/invalid level signal at the control terminal in the switch circuit. With the switch circuit including a switch unit and a drive unit as an example, wherein, the switch unit includes a gate drive NMOSFET, the control terminal of the switch unit is the gate of the NMOSFET, and the output terminal of the voltage regulator is connected with the gate of the NMOSFET. When the voltage regulator receives the first control signal, the voltage regulator is in conductive state such that the gate of the NMOSFET is grounded so as to disconnect the NMOSFET, and when the voltage regulator receives the second control signal, the voltage regulator is in non-conductive state such that the gate of the NMOSFET is driven and controlled by the drive unit. Still with the switch circuit including a switch unit and a drive unit as an example, wherein, the drive unit includes an enable terminal, and the output terminal of the voltage regulator is connected with the enable terminal. When the voltage regulator receives the first control signal, the voltage regulator is in a conductive state so that the drive unit cannot output a drive signal, and when the voltage regulator receives the second control signal, the voltage regulator is in a non-conductive state so that the drive unit can be controlled by other circuits in the circuit system to output the drive signal.

In some other embodiments, the switch circuit control module controls the switch circuit to be disconnected forcibly through controlling the voltage of drive signal at the input terminal of the switch circuit, so as to realize the purpose that the switch circuit is not controlled by other drive circuits in the circuit system. In one specific example, the switch circuit control module includes a driver, and the driver is connected with the input terminal of the switch circuit and is configured to control a drive unit of the switch circuit not to output a drive signal to the switch circuit when the first control signal is received, until the second control signal is received. Wherein, the driver includes a driving amplifier, and the switch circuit can be controlled to turn on or turn off depending on that the driving amplifier outputs the drive signal or does not output correspondingly. With the switch circuit including a switch unit as an example, the driver is connected with the input terminal of the switch unit, when the driver receives the first control signal, the driver does not output a drive signal to the switch circuit, and when the driver receives the second control signal, the driver outputs a drive signal to the switch circuit, or a control signal of other circuits in the circuit system can be served as a drive signal and output to the switch circuit. It should be noted that, the driver and the drive unit contained in the switch circuit can be the same one, or the driver may be a front stage driving circuit for the drive unit contained in the switch circuit.

Based on the protection circuit described in the above examples, please refer to FIG. 7 which shows a circuit structural diagram of the protection circuit in one example. Wherein, according to the connection relationship of the circuit structure shown in FIG. 7, the circuit protection method is performed as follows: the switch circuit 11 includes a drive unit A and a switch power tube Mpwr, and the protection circuit includes: an acquisition module 21, a detection module 22, a delay control module 23 and a switch circuit control module 24. Wherein, the acquisition module includes a high-pass filter which is constituted by a capacitor Ccouple and a resistor Rpd, wherein, one terminal of the capacitor Ccouple is connected with a drain of the switch power tube Mpwr, and the other terminal outputs detection signal Vfb. The detection module includes a comparator C, the positive input terminal of the comparator C receives detection signal Vfb, a negative input terminal thereof receives an warning voltage threshold Vt, and an output terminal thereof outputs detection result Protect level signal. The delay control module is configured to extend the time duration in which the switch circuit is in forcible non-conductive state, and can also be referred as Turn-off delay module. The delay control module includes a timer and a logic device group, wherein, the logic device group includes a first logic device group and a second logic device group (both are not shown in the figure), the first logic device group controls the timer to start a delay timing or to reset based on the received Protect level signal, and the second logic device group outputs the first control signal and the second control signal based on the logic configuration between the received Protect level signal and the overtime signal output by the timer. The switch circuit control module includes a voltage regulator (MOSFET Mpd) which is connected with the MOSFET Mpwr. In the duration of the first control signal, the switch power tube Mpd is turned on and grounded, and the gate of the switch power tube Mpwr is always at a low level, such that Mpwr is forcibly controlled in forcible non-conductive state; and in the duration of the second control signal, the switch power tube Mpd is turned off, such that Mpwr is released from the forcible non-conductive state, and the switch power tube Mpwr performs turned-on or turned-off operations while being driven by a drive unit A.

Based on the protection circuit described in the above examples, please refer to FIG. 8 which shows a circuit structural diagram of the protection circuit in one specific example. Wherein, according to the connection relationship of the circuit structure shown in FIG. 8, the circuit protection method is performed as follows: the switch circuit 11 includes a drive unit A and a switch power tube Mpwr, and the protection circuit includes: an acquisition module 31, a detection module 32, a delay control module 33 and a switch circuit control module 34. Wherein, the acquisition module includes a switch device (a switch power tube M1 and a resistor Rpd), wherein, the source of the switch power tube M1 is connected with the gate of the switch power tube Mpwr, the gate of the switch power tube M1 is connected with a constant voltage source (VDD), and the drain of the switch power tube M1 outputs detection signal Vfb. The detection module includes a comparator C, the positive input terminal of the comparator C receives detection signal Vfb, a negative input terminal thereof receives an warning voltage threshold Vt, and an output terminal thereof outputs detection result Protect level signal. The delay control module includes a timer and a logic device group, wherein, the logic device group includes a first logic device group and a second logic device group (both are not shown in the figure), the first logic device group controls the timer to start a delay timing or to reset based on the received Protect level signal, and the second logic device group outputs the first control signal and the second control signal based on the logic configuration between the received Protect level signal and the overtime signal output by the timer. The switch circuit control module includes a voltage regulator (switch power tube Mpd) which is connected with the switch power tube Mpwr. In the duration of the first control signal, the switch power tube Mpd is turned on and grounded, and the gate of the switch power tube Mpwr is always at a low level, such that Mpwr is forcibly controlled in forcible non-conductive state; and in the duration of the second control signal, the switch power tube Mpd is turned off, such that Mpwr is released from the forcible non-conductive state, and the switch power tube Mpwr performs turned-on or turned-off operations while being driven by a drive unit A.

Based on the protection circuit described in the above examples, please refer to FIG. 9 which shows a circuit structural diagram of the protection circuit in one specific example. Wherein, according to the connection relationship of the circuit structure shown in FIG. 9, the circuit protection method is performed as follows: the switch circuit 11 includes a drive unit A and a switch power tube Mpwr, and the protection circuit includes: an acquisition module, a detection module 42, a delay control module 43 and a switch circuit control module 44. Wherein, the acquisition module includes a wire which is connected to a load, so as to sample voltage signal VBUS of the power supply bus and the voltage signal VBUS is served as the detection signal. In another example, the acquisition module includes a sampling resistor which is connected to a load, so as to sample voltage signal reflecting the voltage signal VBUS, and the sampled voltage signal reflecting the voltage signal VBUS is served as the detection signal. The detection module includes a comparator C, a positive input terminal of the comparator C receives detection signal VBUS, a negative input terminal thereof receives an warning voltage threshold Vt, and an output terminal thereof outputs detection result Protect level signal. The delay control module includes a timer and a logic device group, wherein, the logic device group includes a first logic device group and a second logic device group (both are not shown in the figure), the first logic device group controls the timer to start a delay timing or to reset based on the received Protect level signal, and the second logic device group outputs the first control signal and the second control signal based on the logic configuration between the received Protect level signal and the overtime signal output by the timer. The switch circuit control module includes a voltage regulator (switch power tube Mpd) which is connected with the switch power tube Mpwr. In the duration of the first control signal, the switch power tube Mpd is turned on and grounded, and the gate of the switch power tube Mpwr is always at a low level, such that Mpwr is forcibly controlled in forcible non-conductive state; and in the duration of the second control signal, the switch power tube Mpd is turned off, such that Mpwr is released from the forcible non-conductive state and the switch power tube Mpwr performs turned-on or turned-off operations while being driven by a drive unit A.

Figure 14:
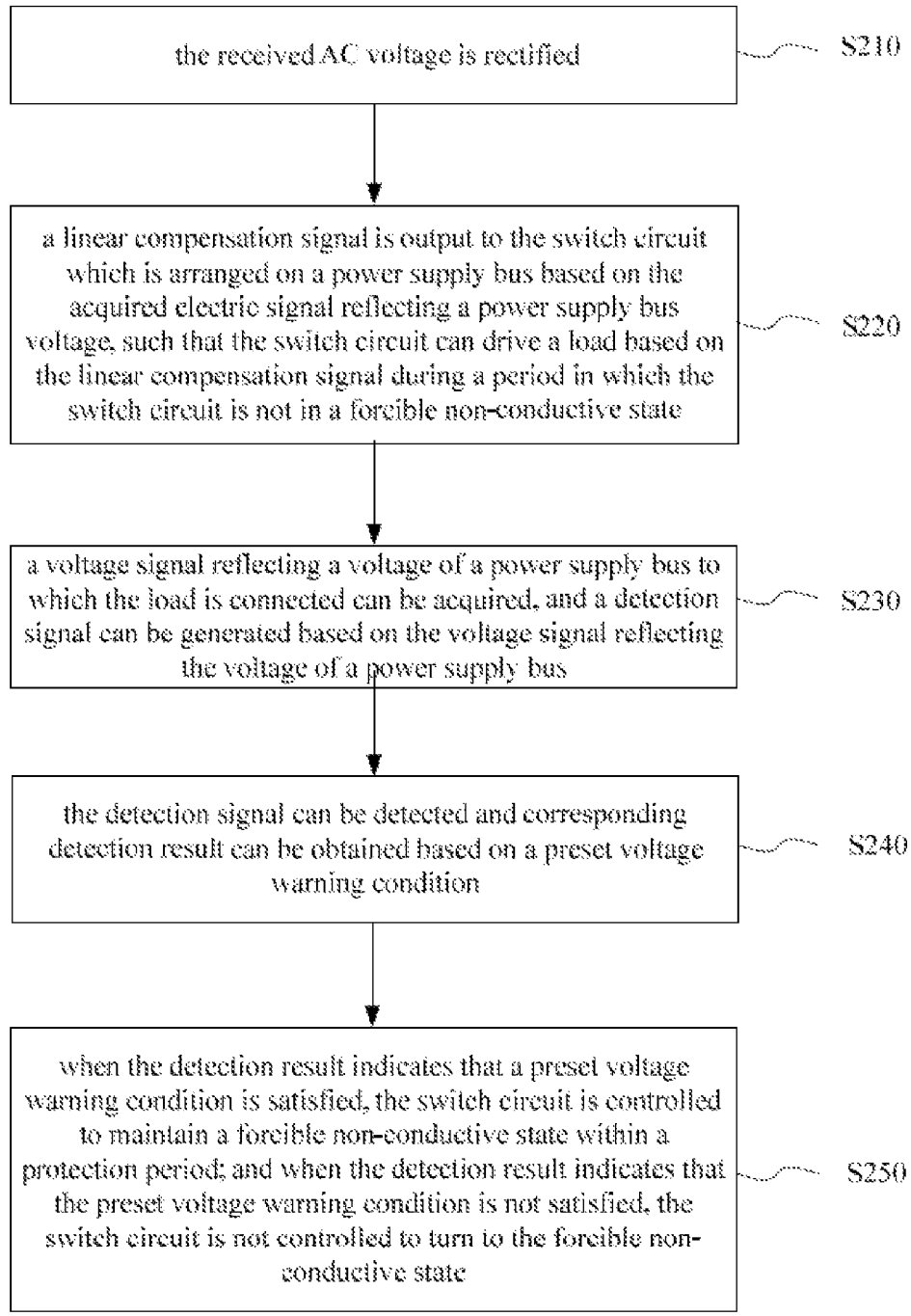
FIG. 14 shows a flow chart of a drive method in the present application in one embodiment.

Please refer to FIG. 14 which shows a flow chart of a drive method in the present application in one embodiment. Wherein, the drive method can be performed by the above drive system, or performed by any other drive systems which can perform the drive method.

In step S210, the received AC voltage is rectified.

Here, the step can be performed by the rectifying circuit. For example, the rectifying circuit includes a rectifier bridge constituted by four diodes, and the rectifier bridge converts waveform of the AC into waveform of the power supply which takes half of a power frequency cycle as a cycle.

In step 220, a linear compensation signal is output to the switch circuit which is arranged on a power supply bus based on the acquired electric signal reflecting a power supply bus voltage, such that the switch circuit can drive a load based on the linear compensation signal during a period in which the switch circuit is not in a forcible non-conductive state.

Here, the step can be performed by the linear compensation circuit. During the switch circuit is turned on, the linear compensation circuit is configured to output a linear compensation signal to the switch circuit based on the acquired voltage signal reflecting the power supply bus voltage. Herein, the linear compensation circuit can include a sampling unit and a line voltage generation unit, wherein, the sampling unit is connected with the power supply bus, and converts the voltage signal of the power supply bus into a detection signal which can reflect the voltage signal, and outputs the detection signal to the line voltage generation unit. And based on a reference voltage, the line voltage generation unit outputs a linear voltage compensation signal to the switch circuit, wherein the changes of the linear voltage compensation signal and the changes of the detection signal are opposite. Wherein, the switch circuit is configured to control the power supply bus to be in the conductive or non-conductive state. In some embodiments, the linear compensation circuit can also be a circuit example described in the U.S. patent application Ser. No. 16/024,001, which can herein incorporated by reference.

In step S230, a voltage signal reflecting a voltage of a power supply bus to which the load is connected can be acquired, and a detection signal can be generated based on the voltage signal reflecting the voltage of a power supply bus.

In step S240, the detection signal can be detected and corresponding detection result can be obtained based on a preset voltage warning condition.

In step S250, when the detection result indicates that a preset voltage warning condition is satisfied, the switch circuit is controlled to maintain a forcible non-conductive state within a protection period; and when the detection result indicates that the preset voltage warning condition is not satisfied, the switch circuit is not controlled to turn to the forcible non-conductive state.

Here, the step S230, step S230 and step S250 are corresponding to the step S110, step S120 and step S130 respectively, and those will not be described in detail herein. In the period during which the protection circuit controls the switch circuit to maintain a forcible non-conductive state based on the detection result, the linear compensation circuit does not output the linear compensation signal, and until the maintained forcible non-conductive state is released and the switch circuit is turned on, the linear compensation circuit outputs the linear compensation signal.

Above all, the protection circuit, the drive system, the chip and the circuit protection method and the drive method provided in the present application through detecting whether the voltage signal reflecting a power supply bus voltage satisfies a preset voltage warning condition, and disconnecting the switch circuit forcibly and maintaining the forcible non-conductive state within a protection duration when the preset voltage warning condition is satisfied, thereby the damage to electronics caused by ring wave can be avoided.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A protection circuit used in a linear driving system for LED, comprising:
   a detection unit configured to acquire a voltage signal based on a power supply bus voltage, and to generate a detection result, wherein the detection result indicates an undesirable oscillation on the power supply bus voltage; and
   a control unit coupled to the detection unit and configured to generate a control signal based on the detection result, wherein the control unit comprises a delay control module connected with the detection unit, the delay control module configured to output a first control signal when the undesirable oscillation happens, and output a second control signal after a protection period when the undesirable oscillation is disappeared; and
   a switch circuit being controlled by the first control signal and the second control signal to be turned off for the protection period;
   wherein the switch circuit comprises at least one first power switch;
   wherein the detection unit comprises at least one capacitor and at least one resistor connected in series with the at least one capacitor to form a high-pass filter configured to generate the detection result; and
   wherein the at least one capacitor is coupled with the first power switch to detect the power supply bus voltage at a first terminal of the first power switch.

2. The protection circuit of claim 1, wherein the detection unit is coupled with the power supply bus to acquire the voltage signal reflecting an instantaneous value of the power supply bus voltage.

3. The protection circuit of claim 1, wherein the detection unit is coupled with the power supply bus to acquire the voltage signal reflecting a gradient of the power supply bus voltage.

4. The protection circuit of claim 1, wherein the detection unit further comprises:
   an acquisition module configured to detect the power supply bus voltage and generate a detection signal; and
   a detection module configured to receive the detection signal and generate the detection result.

5. The protection circuit of claim 4, wherein the acquisition module comprises the at least one capacitor coupled with the switch circuit to detect the power supply bus voltage.

6. The protection circuit of claim 5, wherein the acquisition module further comprises the at least one resistor connected in series with the at least one capacitor to form a high-pass filter configured to generate the detection signal.

7. The protection circuit of claim 1, wherein the at least one capacitor is a parasitic capacitor of the first power switch.

8. The protection circuit of claim 4, wherein the detection module comprises a comparator, the comparator comprising a first input terminal for receiving the detection signal, and a second input terminal for receiving a voltage threshold.

9. The protection circuit of claim 1, wherein the control unit comprises a drive module, configured to receive the first control signal and the second control signal from the delay control module, and configured to control the first power switch to be turned off according to the first control signal, and to be turned on according to the second control signal.

10. The protection circuit of claim 9, wherein the drive module comprises a voltage regulator configured to regulate a voltage on a control terminal of the switch circuit based on the first control signal and the second control signal.

11. A linear driving system for LED with high power factor, comprising:
   a rectifying circuit, receiving an AC voltage and generating a DC voltage to a power supply bus;
   a protection circuit, coupled with the power supply bus, comprising:
   a detection unit configured to acquire a voltage signal based on a power supply bus voltage, and generate a detection result, wherein the detection result indicates an undesirable oscillation on the power supply bus voltage; and
   a control unit coupled to the detection unit and configured to generate a control signal based on the detection result, wherein the control unit comprises a delay control module connected with the detection unit, the delay control module configured to output a first control signal when the undesirable oscillation happens, and output a second control signal after a protection period when the undesirable oscillation is disappeared; and
   a switch circuit being controlled by the first control signal and the second control signal to be turned off for the protection period;
   wherein the switch circuit comprises at least one first power switch;
   wherein the detection unit comprises at least one capacitor and at least one resistor connected in series with the at least one capacitor to form a high-pass filter configured to generate the detection result; and
   wherein the at least one capacitor is coupled with the first power switch to detect the power supply bus voltage at a first terminal of the first power switch.

12. The linear driving system of claim 11, wherein the detection unit is coupled with the power supply bus to acquire the voltage signal reflecting an instantaneous value of the power supply bus voltage.

13. The linear driving system of claim 11, wherein the detection unit is coupled with the power supply bus to acquire the voltage signal reflecting a gradient of the power supply bus voltage.

14. The linear driving system of claim 11, wherein the detection unit further comprises:
   an acquisition module configured to detect the power supply bus voltage and generate a detection signal; and
   a detection module configured to receive the detection signal and generate the detection result.

15. The linear driving system of claim 14, wherein the acquisition module comprises the at least one capacitor coupled with the switch circuit to detect the power supply bus voltage.

16. The linear driving system of claim 15, wherein the acquisition module further comprises the at least one resistor connected in series with the at least one capacitor to form a low-pass filter configured to generate the detection signal.

* * * * *